(12) United States Patent
Suzuki et al.

(10) Patent No.: US 12,084,083 B2
(45) Date of Patent: Sep. 10, 2024

(54) VEHICLE AND METHOD OF CONTROLLING VEHICLE

(71) Applicant: TOYOTA JIDOSHA KABUSHIKI KAISHA, Toyota (JP)

(72) Inventors: Ikuma Suzuki, Okazaki (JP); Yuta Ohashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/319,791

(22) Filed: May 18, 2023

(65) Prior Publication Data
US 2023/0294732 A1    Sep. 21, 2023

Related U.S. Application Data

(63) Continuation of application No. 17/722,934, filed on Apr. 18, 2022, now Pat. No. 11,702,100, which is a continuation of application No. 17/154,010, filed on Jan. 21, 2021, now Pat. No. 11,691,644.

(30) Foreign Application Priority Data

Jan. 31, 2020 (JP) ................................. 2020-015716

(51) Int. Cl.
*B60W 60/00* (2020.01)
*B60W 30/188* (2012.01)

(52) U.S. Cl.
CPC ........ *B60W 60/001* (2020.02); *B60W 30/188* (2013.01); *B60W 2556/50* (2020.02); *B60W 2720/106* (2013.01)

(58) Field of Classification Search
None
See application file for complete search history.

(56) References Cited

U.S. PATENT DOCUMENTS

| 9,280,145 B2* | 3/2016 | Hannon | H04L 67/12 |
| 10,525,979 B1* | 1/2020 | Grant | B60W 40/08 |
| 10,940,864 B2* | 3/2021 | Heckmann | G08G 1/165 |
| 10,996,673 B1* | 5/2021 | Katzourakis | G05D 1/021 |

(Continued)

FOREIGN PATENT DOCUMENTS

| DE | 10 2014 204 287 A1 | 9/2015 |
| JP | 2007-230277 A | 9/2007 |

(Continued)

OTHER PUBLICATIONS

Notice of Allowance mailed Feb. 15, 2023, in U.S. Appl. No. 17/154,010.

(Continued)

*Primary Examiner* — Jonathan M Dager
(74) *Attorney, Agent, or Firm* — Oblon, McClelland, Maier & Neustadt, L.L.P.

(57) ABSTRACT

An ADS performs processing including setting an immobilization command to "Applied" when an autonomous state has been set to an autonomous mode, when an acceleration command has a value indicating deceleration, when an actual moving direction indicates a standstill state, and when a wheel lock request is issued, setting the acceleration command to V1, and setting the acceleration command to zero when an immobilization status has been set to "11".

4 Claims, 21 Drawing Sheets

(56) References Cited

U.S. PATENT DOCUMENTS

| | | | |
|---|---|---|---|
| 11,130,501 B2* | 9/2021 | Liu | B60W 50/029 |
| 2014/0277990 A1 | 9/2014 | Zambou | |
| 2015/0146328 A1 | 5/2015 | Mikami et al. | |
| 2015/0244207 A1 | 8/2015 | Narita | |
| 2015/0251639 A1* | 9/2015 | Sautter | B60T 8/885 |
| | | | 701/70 |
| 2016/0016590 A1* | 1/2016 | Fernandez Pozo | H04W 4/48 |
| | | | 702/145 |
| 2016/0167653 A1* | 6/2016 | Malone | H04L 12/403 |
| | | | 701/23 |
| 2016/0221549 A1* | 8/2016 | Tanase | B60T 7/22 |
| 2016/0377508 A1 | 12/2016 | Perrone et al. | |
| 2017/0361872 A1* | 12/2017 | Gupta | B62D 15/025 |
| 2018/0208166 A1* | 7/2018 | Eckert | B60T 8/327 |
| 2018/0299898 A1* | 10/2018 | Luo | B60W 60/0051 |
| 2018/0345921 A1* | 12/2018 | Mannherz | B60T 7/12 |
| 2019/0220006 A1* | 7/2019 | Ueno | G05D 1/0055 |
| 2019/0332106 A1* | 10/2019 | Belloni Mourao | B60W 40/08 |
| 2021/0039633 A1* | 2/2021 | Seo | B62D 15/0285 |
| 2021/0229697 A1* | 7/2021 | Lee | B60W 30/08 |
| 2021/0237722 A1* | 8/2021 | Suzuki | B60W 30/0953 |
| 2021/0237765 A1 | 8/2021 | Ando | |
| 2021/0237766 A1 | 8/2021 | Suzuki | |
| 2021/0245654 A1 | 8/2021 | Ando | |
| 2021/0245778 A1 | 8/2021 | Suzuki | |
| 2021/0245785 A1* | 8/2021 | Suzuki | B60W 30/18109 |
| 2021/0245806 A1 | 8/2021 | Suzuki | |
| 2021/0247760 A1 | 8/2021 | Kusama | |
| 2021/0247769 A1 | 8/2021 | Suzuki | |
| 2022/0032905 A1* | 2/2022 | Lee | B60N 2/0276 |
| 2022/0080935 A1* | 3/2022 | Terada | B60T 8/92 |
| 2022/0097660 A1* | 3/2022 | Semenov | B60T 8/17 |
| 2022/0126845 A1* | 4/2022 | Hsu | B60L 7/26 |

FOREIGN PATENT DOCUMENTS

| | | |
|---|---|---|
| JP | 2015-138330 A | 7/2015 |
| JP | 2018-506461 | 3/2018 |
| JP | 2018-132015 A | 8/2018 |
| JP | 2019-127136 | 8/2019 |
| WO | WO 02/49894 A2 | 6/2002 |
| WO | WO2020/016622 A1 | 1/2020 |

OTHER PUBLICATIONS

Notice of Allowance issued Nov. 9, 2022, in U.S. Appl. No. 17/154,010.

Anonymous: "Overview of Retrofit Kits for Autonomous Driving—The Last Driver License Holder . . . ", Oct. 21, 2017 (Oct. 21, 2017), Retrieved from the internet: URL: https:/thelastdriverlicenseholder.com/2017/10/21/overview-of-retrofit-kits-for-autonomous-driving/ [retrieved on Mar. 22, 2021], XP055788608, 2 pages.

* cited by examiner

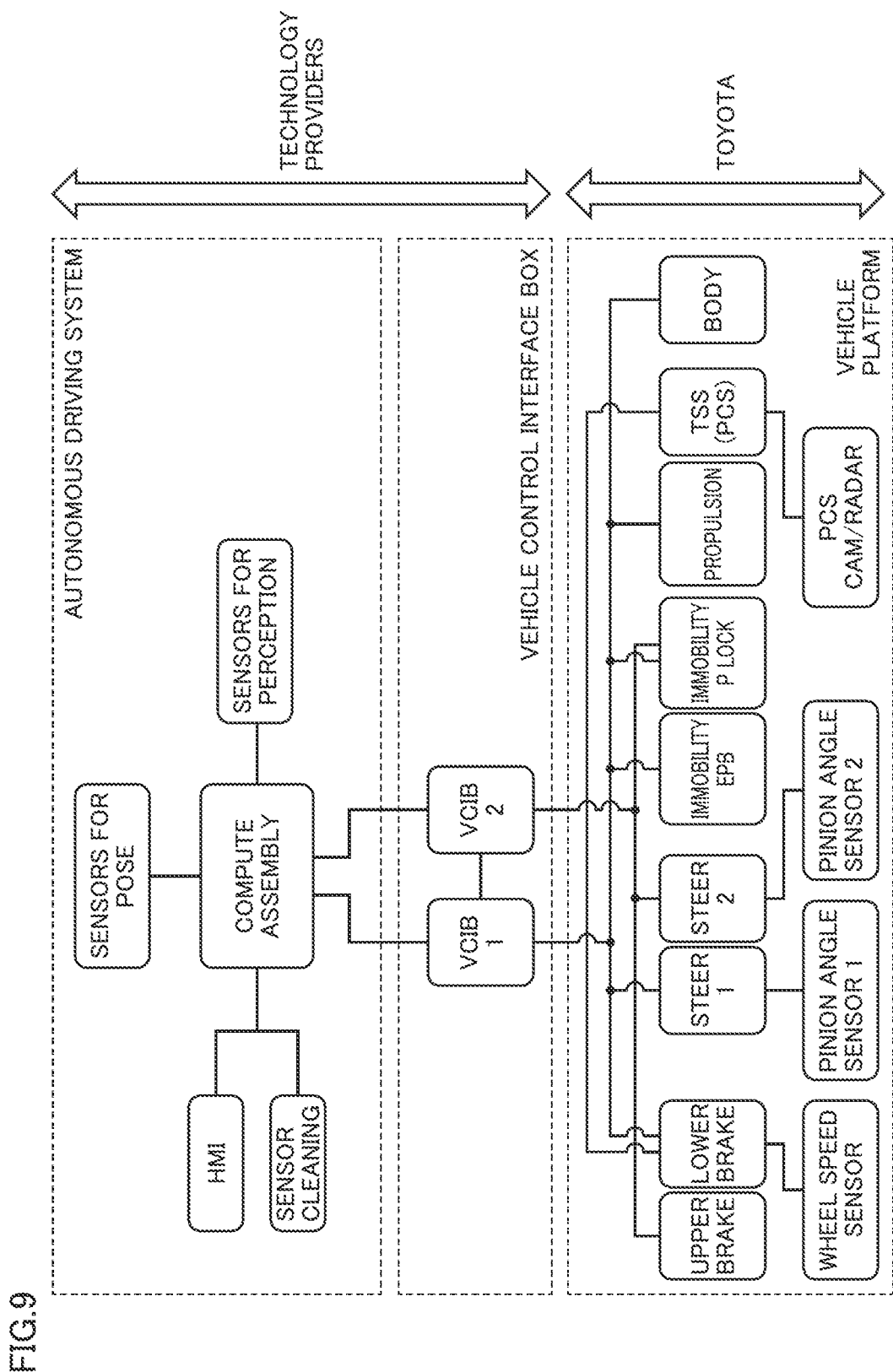

FIG.10

| #1: CREATING A DRIVING PLAN | THE ADS CREATES A DRIVING PLAN. |
|---|---|
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: EXECUTION OF THE API WITH THE VALUE | THE ADS EXECUTES THE API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN THAT THE VEHICLE BEHAVIOR IS REFLECTED TO |

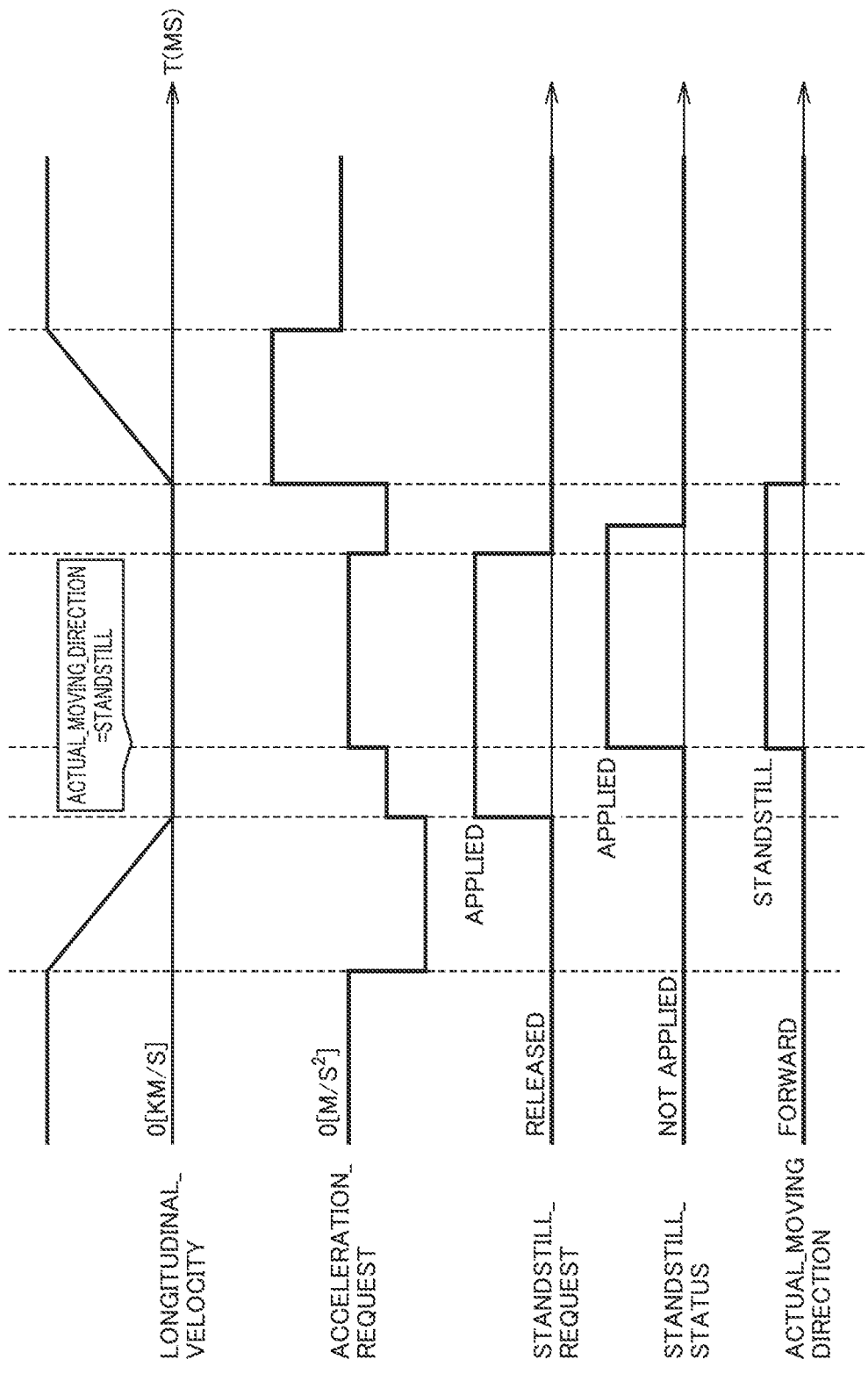

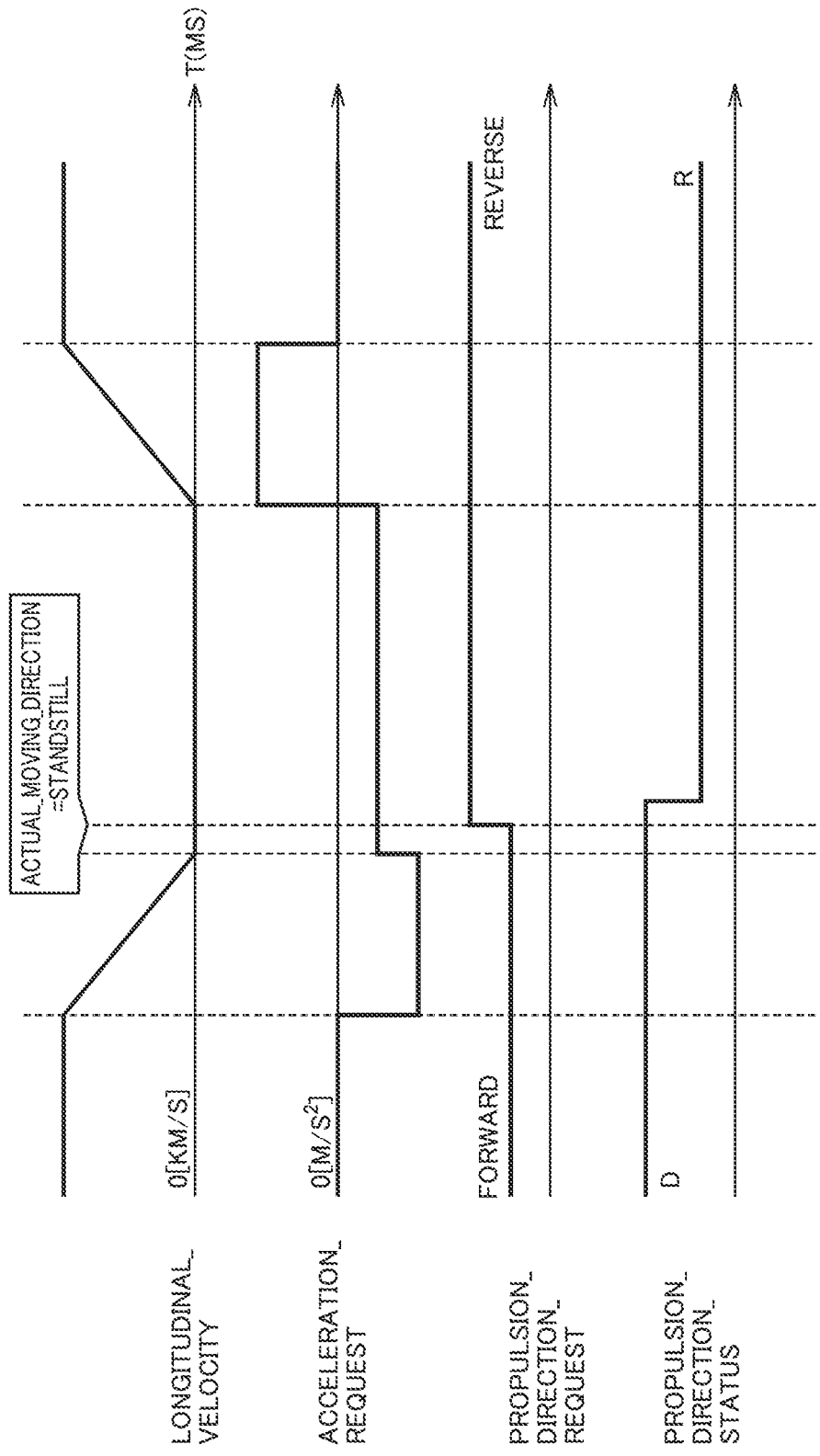

VEHICLE AND METHOD OF CONTROLLING VEHICLE

CROSS-REFERENCE TO RELATED APPLICATIONS

This application is a continuation of U.S. application Ser. No. 17/722,934, filed on Apr. 18, 2022, which is a continuation of U.S. application Ser. No. 17/154,010, filed on Jan. 21, 2021, which is based on Japanese Patent Application No. 2020-015716 filed with the Japan Patent Office on Jan. 31, 2020, the entire contents of which are hereby incorporated by reference.

BACKGROUND

Field

The present disclosure relates to control of a vehicle that is carrying out autonomous driving.

Description of the Background Art

An autonomous driving system that has a vehicle travel without requiring an operation by a user has recently been developed. For example, for being mounted on an existing vehicle, the autonomous driving system may be provided separately from the vehicle with an interface being interposed.

For such an autonomous driving system, for example, Japanese Patent Laying-Open No. 2018-132015 discloses a technique allowing addition of an autonomous driving function without greatly modifying an existing vehicle platform, by providing an electronic control unit (ECU) that manages motive power of a vehicle and an ECU for autonomous driving independently of each other.

SUMMARY

An operation by a user is not performed during autonomous driving of a vehicle. Therefore, when a vehicle is parked, wheels should be fixed at appropriate timing by using a parking brake or a parking lock.

An object of the present disclosure is to provide a vehicle on which an autonomous driving system is mountable, the vehicle fixing wheels at appropriate timing during autonomous driving.

A vehicle according to one aspect of the present disclosure is a vehicle on which an autonomous driving system is mountable. The vehicle includes a vehicle platform that carries out vehicle control in accordance with a command from the autonomous driving system and a vehicle control interface that interfaces between the autonomous driving system and the vehicle platform. A first command that requests for an acceleration value or a deceleration value and a second command that requests for immobilization of the vehicle are transmitted from the autonomous driving system to the vehicle platform through the vehicle control interface. A signal indicating a standstill state of the vehicle is transmitted from the vehicle platform to the autonomous driving system through the vehicle control interface. When a request for deceleration is made to the vehicle platform in the first command, the vehicle platform transmits the signal to the autonomous driving system at the time when the vehicle comes to a standstill. The vehicle platform immobilizes the vehicle in response to the second command received after transmission of the signal.

Thus, after transmission of the signal indicating the standstill state, the vehicle is immobilized in response to the second command that requests for immobilization of the vehicle. Therefore, when the vehicle comes to a standstill, the wheels can be fixed at appropriate timing.

In one embodiment, a request for a constant deceleration value is made in the first command until a request for immobilization of the vehicle is made in the second command.

Since the request for the constant deceleration value is thus made until the request for immobilization of the vehicle is made, movement of the vehicle can be restricted.

Furthermore, in one embodiment, a value that represents the first command is set to $-0.4$ m/s$^2$.

Since a request for the constant deceleration value set to $-0.4$ m/s$^2$ is thus made until the request for immobilization of the vehicle is made, movement of the vehicle can be restricted.

Furthermore, in one embodiment, in releasing immobilization of the vehicle, a request for release of immobilization of the vehicle is made in the second command and a request for deceleration is made in the first command while the vehicle is in a standstill.

In releasing immobilization of the vehicle, the request for deceleration is thus made in the first command. Therefore, movement of the vehicle can be restricted.

Furthermore, in one embodiment, when a request for immobilization of the vehicle is made in the second command while the vehicle is traveling, the request is rejected.

Since the request is thus rejected when a request for immobilization of the vehicle is made in the second command while the vehicle is traveling, immobilization of the vehicle while the vehicle is traveling can be suppressed.

Furthermore, in one embodiment, when one of a request for immobilization of the vehicle and a request for release of immobilization of the vehicle is made, in parallel to that request, a request for a constant deceleration value is made in the first command.

Since the request for the constant deceleration value is thus made in parallel to one of the request for immobilization of the vehicle and the request for release of immobilization of the vehicle, movement of the vehicle can be restricted when the vehicle is immobilized or immobilization is released.

Furthermore, in one embodiment, a value that represents the first command is set to $-0.4$ m/s$^2$.

Since a request for the constant deceleration value set to $-0.4$ m/s$^2$ is thus made in parallel to one of the request for immobilization of the vehicle and the request for release of immobilization of the vehicle, movement of the vehicle can be restricted when the vehicle is immobilized or immobilization is released.

A vehicle according to another aspect of the present disclosure includes an autonomous driving system and a vehicle platform that carries out vehicle control in accordance with a command from the autonomous driving system. A first command that requests for acceleration or deceleration and a second command that requests for immobilization of the vehicle are transmitted from the autonomous driving system to the vehicle platform. A signal indicating a standstill state of the vehicle is transmitted from the vehicle platform to the autonomous driving system. When the autonomous driving system requests the vehicle platform to decelerate in the first command for stopping the vehicle, it requests the vehicle platform to immobilize the vehicle in the second command after the signal indicates a standstill state.

BRIEF DESCRIPTION OF THE DRAWINGS

FIG. 9 is a diagram of a system configuration of a MaaS vehicle.

FIG. 10 is a diagram showing a typical flow in an autonomous driving system.

FIG. 11 is a diagram showing an exemplary timing chart of an API relating to stop and start of the MaaS vehicle.

FIG. 12 is a diagram showing an exemplary timing chart of the API relating to shift change of the MaaS vehicle.

DESCRIPTION OF THE PREFERRED EMBODIMENTS

Figure 1:
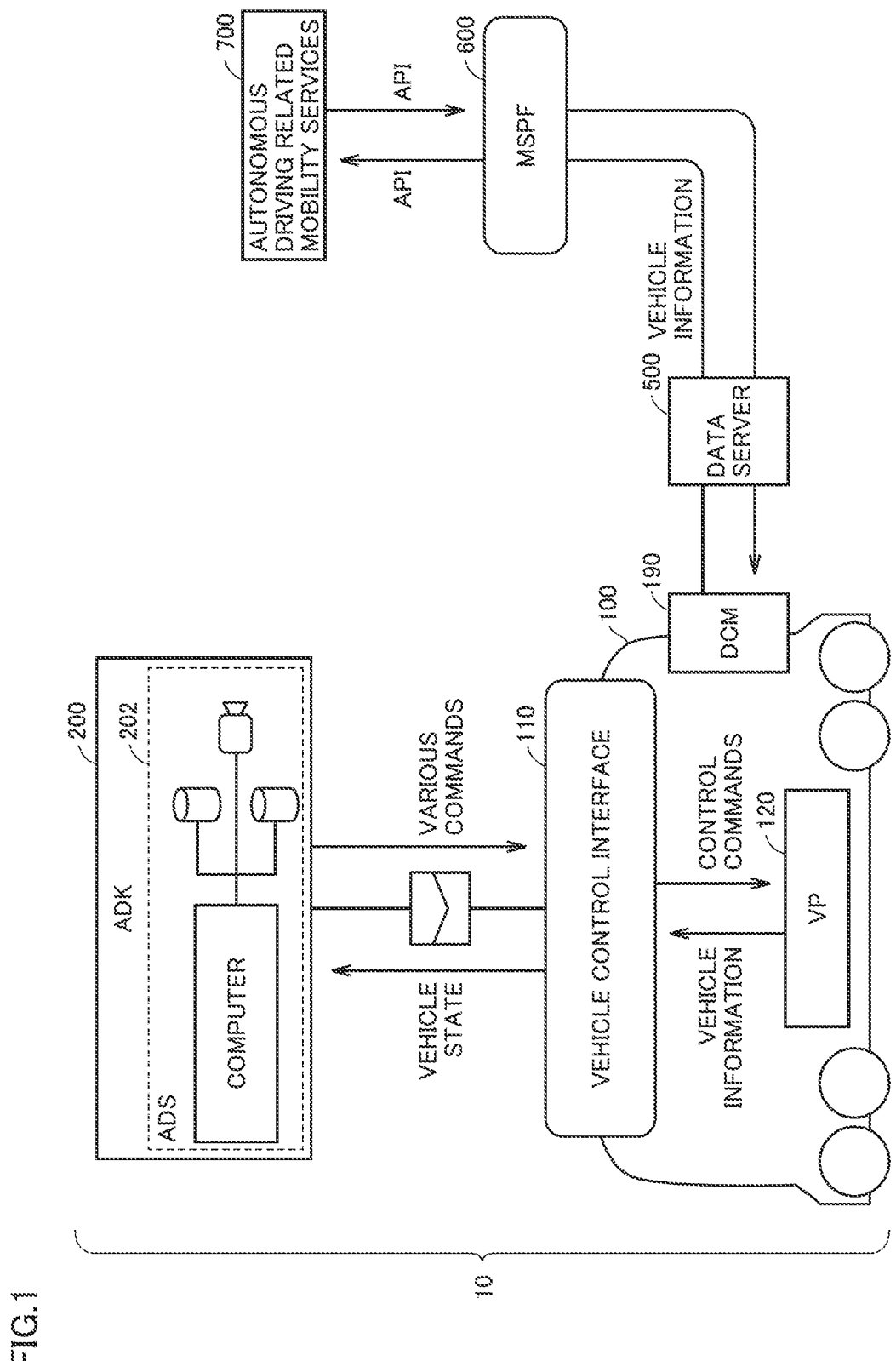
FIG. 1 is a diagram showing overview of a MaaS system in which a vehicle according to an embodiment of the present disclosure is used.

An embodiment of the present disclosure will be described below in detail with reference to the drawings. The same or corresponding elements in the drawings have the same reference characters allotted and description thereof will not be repeated.

FIG. 1 is a diagram showing overview of a mobility as a service (MaaS) system in which a vehicle according to an embodiment of the present disclosure is used.

Referring to FIG. 1, this MaaS system includes a vehicle 10, a data server 500, a mobility service platform (which is denoted as "MSPF" below) 600, and autonomous driving related mobility services 700.

Vehicle 10 includes a vehicle main body 100 and an autonomous driving kit (which is denoted as "ADK" below) 200. Vehicle main body 100 includes a vehicle control interface 110, a vehicle platform (which is denoted as "VP" below) 120, and a data communication module (DCM) 190.

Vehicle 10 can carry out autonomous driving in accordance with commands from ADK 200 attached to vehicle main body 100. Though FIG. 1 shows vehicle main body 100 and ADK 200 at positions distant from each other, ADK 200 is actually attached to a rooftop or the like of vehicle main body 100. ADK 200 can also be removed from vehicle main body 100. While ADK 200 is not attached, vehicle main body 100 can travel by driving by a user. In this case, VP 120 carries out travel control (travel control in accordance with an operation by a user) in a manual mode.

Vehicle control interface 110 can communicate with ADK 200 over a controller area network (CAN). Vehicle control interface 110 receives various commands from ADK 200 or outputs a state of vehicle main body 100 to ADK 200 by executing a prescribed application program interface (API) defined for each communicated signal.

When vehicle control interface 110 receives a command from ADK 200, it outputs a control command corresponding to the received command to VP 120. Vehicle control interface 110 obtains various types of information on vehicle main body 100 from VP 120 and outputs the state of vehicle main body 100 to ADK 200. A configuration of vehicle control interface 110 will be described in detail later.

VP 120 includes various systems and various sensors for controlling vehicle main body 100. VP 120 carries out various types of vehicle control in accordance with a command given from ADK 200 through vehicle control interface 110. Namely, as VP 120 carries out various types of vehicle control in accordance with a command from ADK 200, autonomous driving of vehicle 10 is carried out. A configuration of VP 120 will also be described in detail later.

ADK 200 includes an autonomous driving system (which is denoted as "ADS" below) 202 for autonomous driving of vehicle 10. ADS 202 creates, for example, a driving plan of vehicle 10 and outputs various commands for traveling vehicle 10 in accordance with the created driving plan to vehicle control interface 110 in accordance with the API defined for each command. ADS 202 receives various signals indicating states of vehicle main body 100 from vehicle control interface 110 in accordance with the API defined for each signal and has the received vehicle state reflected on creation of the driving plan. A configuration of ADS 202 will also be described later.

DCM 190 includes a communication interface (I/F) for vehicle main body 100 to wirelessly communicate with data server 500. DCM 190 outputs various types of vehicle information such as a speed, a position, or an autonomous driving state to data server 500. DCM 190 receives from autonomous driving related mobility services 700 through MSPF 600 and data server 500, various types of data for management of travel of an autonomous driving vehicle including vehicle 10 by mobility services 700.

MSPF 600 is an integrated platform to which various mobility services are connected. In addition to autonomous driving related mobility services 700, not-shown various mobility services (for example, various mobility services provided by a ride-share company, a car-sharing company, an insurance company, a rent-a-car company, and a taxi company) are connected to MSPF 600. Various mobility services including mobility services 700 can use various functions provided by MSPF 600 by using APIs published on MSPF 600, depending on service contents.

Autonomous driving related mobility services 700 provide mobility services using an autonomous driving vehicle including vehicle 10. Mobility services 700 can obtain, for example, operation control data of vehicle 10 that communicates with data server 500 or information stored in data server 500 from MSPF 600, by using the APIs published on MSPF 600. Mobility services 700 transmit, for example, data for managing an autonomous driving vehicle including vehicle 10 to MSPF 600, by using the API.

MSPF 600 publishes APIs for using various types of data on vehicle states and vehicle control necessary for development of the ADS, and an ADS provider can use as the APIs, the data on the vehicle states and vehicle control necessary for development of the ADS stored in data server 500.

Figure 2:
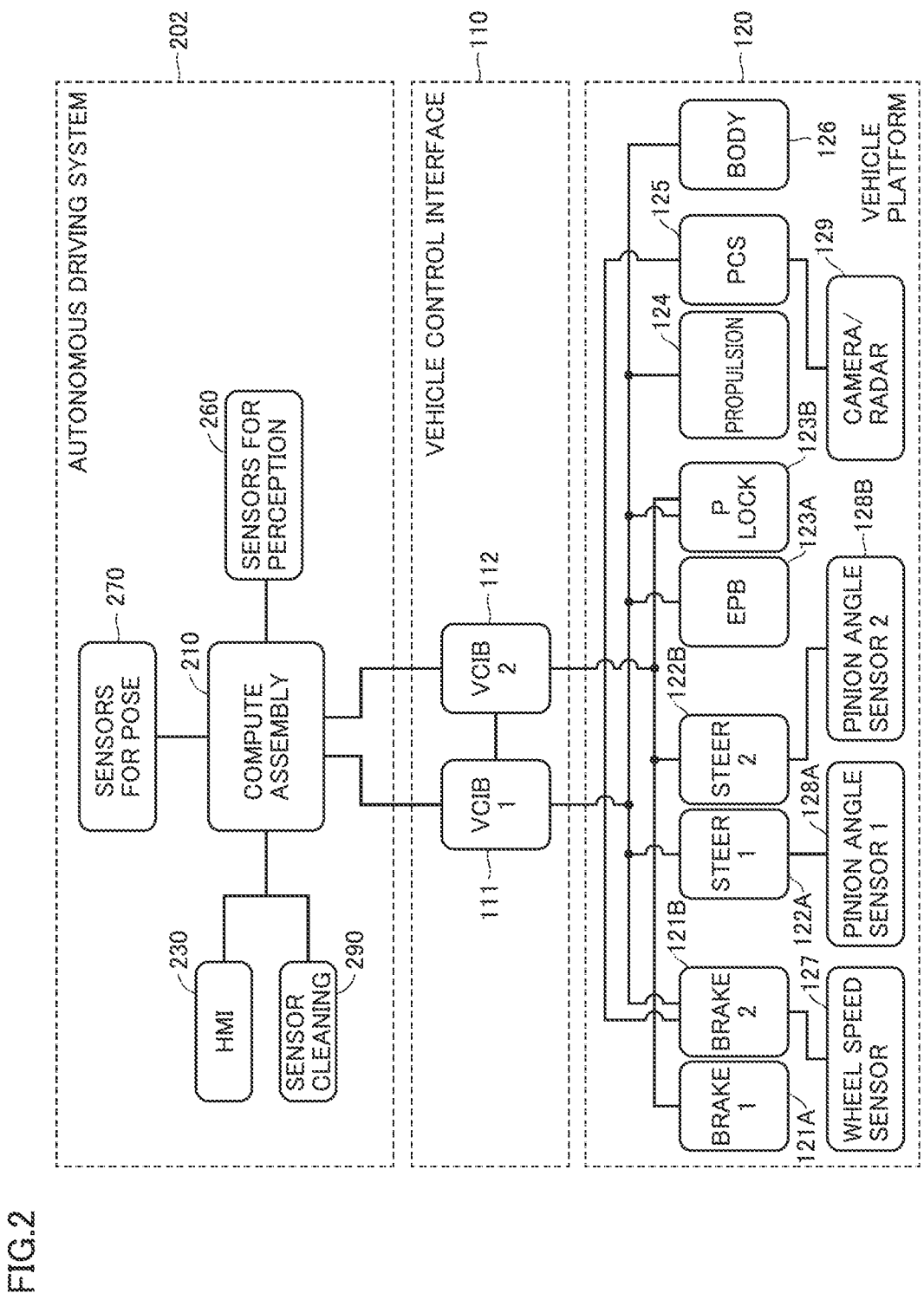
FIG. 2 is a diagram for illustrating in detail a configuration of each of an ADS, a vehicle control interface, and a VP.

FIG. 2 is a diagram for illustrating in detail a configuration of each of ADS 202, vehicle control interface 110, and VP 120. As shown in FIG. 2, ADS 202 includes a compute assembly 210, a human machine interface (HMI) 230, sensors for perception 260, sensors for pose 270, and a sensor cleaning 290.

During autonomous driving of the vehicle, compute assembly 210 obtains an environment around the vehicle and a pose, a behavior, and a position of the vehicle from various sensors which will be described later as well as a state of the vehicle from VP 120 which will be described later through vehicle control interface 110 and sets a next operation (acceleration, deceleration, or turning) of the vehicle. Compute assembly 210 outputs various instructions for realizing a set next operation of vehicle 10 to vehicle control interface 110.

HMI 230 presents information to a user and accepts an operation during autonomous driving, during driving requiring an operation by a user, or at the time of transition between autonomous driving and driving requiring an operation by the user. HMI 230 is implemented, for example, by a touch panel display, a display apparatus, and an operation apparatus.

Sensors for perception 260 include sensors that perceive an environment around the vehicle, and are implemented, for example, by at least any of laser imaging detection and ranging (LIDAR), a millimeter-wave radar, and a camera.

The LIDAR refers to a distance measurement apparatus that measures a distance based on a time period from emission of pulsed laser beams (infrared rays) until return of the laser beams reflected by an object. The millimeter-wave radar is a distance measurement apparatus that measures a distance or a direction to an object by emitting radio waves short in wavelength to the object and detecting radio waves that return from the object. The camera is arranged, for example, on a rear side of a room mirror in a compartment and used for shooting an image of the front of the vehicle. Information obtained by sensors for perception 260 is output to compute assembly 210. As a result of image processing by artificial intelligence (AI) or an image processing processor onto images or video images shot by the camera, another vehicle, an obstacle, or a human in front of the vehicle can be recognized.

Sensors for pose 270 include sensors that detect a pose, a behavior, or a position of the vehicle, and are implemented, for example, by an inertial measurement unit (IMU) or a global positioning system (GPS).

The IMU detects, for example, an acceleration in a front-rear direction, a lateral direction, and a vertical direction of the vehicle and an angular speed in a roll direction, a pitch direction, and a yaw direction of the vehicle. The GPS detects a position of vehicle 10 based on information received from a plurality of GPS satellites that orbit the Earth. Information obtained by sensors for pose 270 is output to compute assembly 210.

Sensor cleaning 290 removes soiling attached to various sensors during travel of the vehicle. Sensor cleaning 290 removes soiling on a lens of the camera or a portion from which laser beams or radio waves are emitted, for example, with a cleaning solution or a wiper.

Vehicle control interface 110 includes a vehicle control interface box (VCIB) 111 and a VCIB 112. VCIBs 111 and 112 each contain a central processing unit (CPU) and a memory (including, for example, a read only memory (ROM) and a random access memory (RAM)) neither of which is shown. Though VCIB 111 is equivalent in function to VCIB 112, it is partially different in a plurality of systems connected thereto that make up VP 120.

VCIBs 111 and 112 are each communicatively connected to compute assembly 210 of ADS 202. VCIB 111 and VCIB 112 are communicatively connected to each other.

Each of VCIBs 111 and 112 relays various instructions from ADS 202 and provides them as control commands to VP 120. More specifically, each of VCIBs 111 and 112 uses various command instructions provided from ADS 202 to generate control commands to be used for control of each system of VP 120 by using information such as a program (for example, an API) stored in a memory and provides the control commands to a destination system. Each of VCIB s 111 and 112 relays vehicle information output from VP 120 and provides the vehicle information as a vehicle state to ADS 202. The information indicating the vehicle state may be identical to the vehicle information, or information to be used for processing performed in ADS 202 may be extracted from the vehicle information.

As VCIB 111 and VCIB 112 equivalent in function relating to an operation of at least one of (for example, braking or steering) systems are provided, control systems between ADS 202 and VP 120 are redundant. Thus, when some kind of failure occurs in a part of the system, the function (turning or stopping) of VP 120 can be maintained by switching between the control systems as appropriate or disconnecting a control system where failure has occurred.

VP 120 includes brake systems 121A and 121B, steering systems 122A and 122B, an electric parking brake (EPB) system 123A, a P-Lock system 123B, a propulsion system 124, a pre-crash safety (PCS) system 125, and a body system 126.

VCIB 111 is communicatively connected to brake system 121B, steering system 122A, EPB system 123A, P-Lock system 123B, propulsion system 124, and body system 126 of the plurality of systems of VP 120, through a communication bus.

VCIB 112 is communicatively connected to brake system 121A, steering system 122B, and P-Lock 123B of the plurality of systems of VP 120, through a communication bus.

Brake systems 121A and 121B can control a plurality of braking apparatuses provided in wheels of the vehicle. Brake system 121A may be equivalent in function to brake system 121B, or any one of them may be able to independently control braking force of each wheel during travel of the vehicle and the other thereof may be able to control braking force such that equal braking force is generated in the wheels during travel of the vehicle. The braking apparatus includes, for example, a disc brake system that is operated with a hydraulic pressure regulated by an actuator.

A wheel speed sensor 127 is connected to brake system 121B. Wheel speed sensor 127 is provided, for example, in each wheel of the vehicle and detects a rotation speed of each wheel. Wheel speed sensor 127 outputs the detected rotation speed of each wheel to brake system 121B. Brake system 121B outputs the rotation speed of each wheel to VCIB 111 as one of pieces of information included in vehicle information.

Each of brake systems 121A and 121B generates a braking instruction to a braking apparatus in accordance with a prescribed control command provided from ADS 202 through vehicle control interface 110. For example, brake systems 121A and 121B control the braking apparatus based on a braking instruction generated in any one of the brake systems, and when a failure occurs in any one of the brake systems, the braking apparatus is controlled based on a braking instruction generated in the other brake system.

Steering systems 122A and 122B can control a steering angle of a steering wheel of vehicle 10 with a steering apparatus. Steering system 122A is similar in function to steering system 122B. The steering apparatus includes, for example, rack-and-pinion electric power steering (EPS) that allows adjustment of a steering angle by an actuator.

A pinion angle sensor 128A is connected to steering system 122A. A pinion angle sensor 128B provided separately from pinion angle sensor 128A is connected to steering system 122B. Each of pinion angle sensors 128A and 128B detects an angle of rotation (a pinion angle) of a pinion gear coupled to a rotation shaft of the actuator that implements the steering apparatus. Pinion angle sensors 128A and 128B output detected pinion angles to steering systems 122A and 122B, respectively.

Each of steering systems 122A and 122B generates a steering instruction to the steering apparatus in accordance with a prescribed control command provided from ADS 202 through vehicle control interface 110. For example, steering systems 122A and 122B control the steering apparatus based on the steering instruction generated in any one of the steering systems, and when a failure occurs in any one of the steering systems, the steering apparatus is controlled based on a steering instruction generated in the other steering system.

EPB system 123A can control the EPB provided in at least any of a plurality of wheels provided in vehicle 10. The EPB is provided separately from the braking apparatus, and fixes a wheel by an operation of an actuator. The EPB, for example, activates a drum brake for a parking brake provided in at least one of the plurality of wheels provided in vehicle 10 to fix the wheel with an actuator, or activates a braking apparatus to fix a wheel with an actuator capable of regulating a hydraulic pressure to be supplied to the braking apparatus separately from brake systems 121A and 121B.

EPB system 123A controls the EPB in accordance with a prescribed control command provided from ADS 202 through vehicle control interface 110.

P-Lock system 123B can control a P-Lock apparatus provided in a transmission of vehicle 10. The P-Lock apparatus fits a protrusion provided at a tip end of a parking lock pawl, a position of which is adjusted by an actuator, into a tooth of a gear (locking gear) provided as being coupled to a rotational element in the transmission. Rotation of an output shaft of the transmission is thus fixed and the wheels are fixed.

P-Lock system 123B controls the P-Lock apparatus in accordance with a prescribed control command provided from ADS 202 through vehicle control interface 110. P-Lock system 123B activates the P-Lock apparatus, for example, when a control command provided from ADS 202 through vehicle control interface 110 includes a control command to set a shift range to a parking range (which is denoted as a P range below), and deactivates the P-Lock apparatus when the control command includes a control command to set the shift range to a range other than the P range.

Propulsion system 124 can switch a shift range with the use of a shift apparatus and can control driving force of vehicle 10 in a direction of movement of vehicle 10 that is generated from a drive source. The shift apparatus can select any of a plurality of shift ranges. The plurality of shift ranges include, for example, the P range, a neutral range (which is denoted as an N range below), a forward travel range (which is denoted as a D range below), and a rearward travel range (which is denoted as an R range below). The drive source includes, for example, a motor generator and an engine.

Propulsion system 124 controls the shift apparatus and the drive source in accordance with a prescribed control command provided from ADS 202 through vehicle control interface 110. Propulsion system 124 controls the shift apparatus to set the shift range to the P range, for example, when a control command provided from ADS 202 through vehicle control interface 110 includes the control command for setting the shift range to the P range.

PCS system 125 controls the vehicle to avoid collision or to mitigate damage by using a camera/radar 129. PCS system 125 is communicatively connected to brake system 121B. PCS system 125 detects an obstacle (an obstacle or a human) in front by using, for example, camera/radar 129, and when it determines that there is possibility of collision based on a distance to the obstacle, it outputs a braking instruction to brake system 121B so as to increase braking force.

Body system 126 can control, for example, components such as a direction indicator, a horn, or a wiper, depending on a state or an environment of travel of vehicle 10. Body system 126 controls the above-described components in accordance with a prescribed control command provided from ADS 202 through vehicle control interface 110.

An operation apparatus that can manually be operated by a user for the braking apparatus, the steering apparatus, the EPB, the P-Lock apparatus, the shift apparatus, and the drive source described above may separately be provided.

Various commands provided from ADS 202 to vehicle control interface 110 include a propulsion direction command that requests for switching of the shift range, an immobilization command that requests for activation or deactivation of the EPB or the P-Lock apparatus, an acceleration command that requests for acceleration or deceleration of vehicle 10, a tire turning angle command that requests for a tire turning angle of the steering wheel, and an automating command that requests for switching of an autonomous state between an autonomous mode and a manual mode.

For example, when the autonomous mode is selected as the autonomous state by an operation by a user onto HMI 230 in vehicle 10 configured as above, autonomous driving is carried out. As described above, ADS 202 initially creates a driving plan during autonomous driving. The driving plan includes a plurality of plans relating to operations by vehicle 10 such as a plan to continue straight travel, a plan to turn left or right at a prescribed intersection on the way on a predetermined travel path, or a plan to change a driving lane to a lane different from the lane on which the vehicle is currently traveling.

ADS 202 extracts a physical control quantity (an acceleration or a deceleration or a tire turning angle) necessary for vehicle 10 to operate in accordance with the created driving plan. ADS 202 splits the extracted physical quantity for each API execution cycle. ADS 202 executes the API based on the split physical quantity and provides various commands to vehicle control interface 110. ADS 202 obtains a vehicle state (for example, an actual moving direction of vehicle 10 or a state of fixation of the vehicle) from VP 120 and creates again a driving plan on which the obtained vehicle state is reflected. ADS 202 thus allows autonomous driving of vehicle 10.

An operation by a user is not performed during autonomous driving of vehicle 10. Therefore, when vehicle 10 is parked, wheels should be fixed at appropriate timing by using the EPB or the P-Lock apparatus.

In the present embodiment, operations as below are assumed to be performed between ADS 202 and VP 120 with vehicle control interface 110 being interposed. Specifically, an acceleration command (corresponding to the first command) that requests for acceleration or deceleration and an immobilization command (corresponding to the second command) that requests for immobilization (fixing of wheels) of the vehicle are transmitted from ADS 202 to VP 120 as described above. An actual moving direction (corresponding to the signal) of vehicle 10 is transmitted from VP 120 to ADS 202. When ADS 202 requests VP 120 to decelerate in the acceleration command for stopping vehicle 10, it requests VP 120 to immobilize vehicle 10 in the immobilization command after the actual moving direction exhibits a standstill state of vehicle 10. In an example where the acceleration command requests for deceleration, when vehicle 10 comes to a standstill, VP 120 transmits to ADS 202, a signal indicating that the actual moving direction exhibits the standstill state. VP 120 immobilizes vehicle 10 in response to the immobilization command received after transmission of the signal.

Vehicle 10 is thus immobilized in response to the immobilization command after the actual moving direction of vehicle 10 exhibits the standstill state. Therefore, when vehicle 10 comes to a standstill, the wheels can be fixed at appropriate timing.

Figure 3:
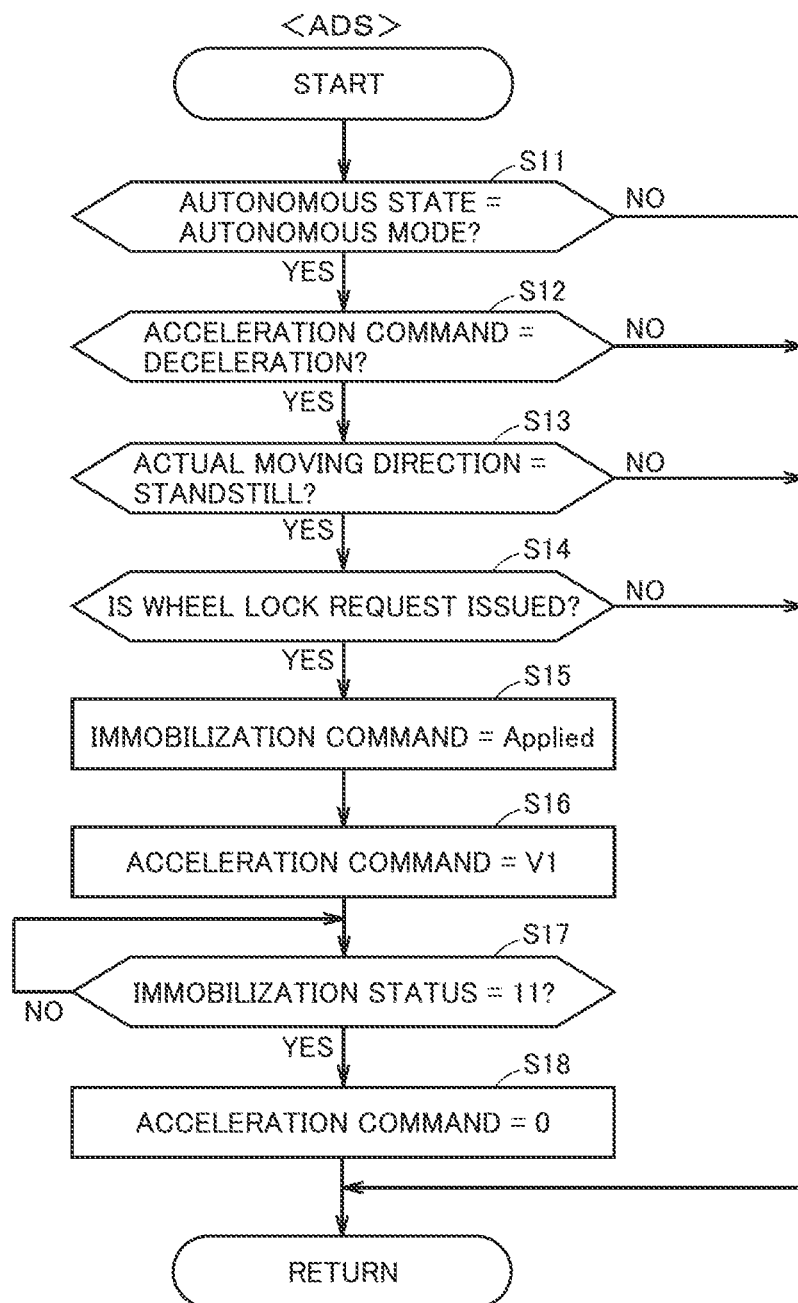
FIG. 3 is a flowchart showing exemplary processing performed in the ADS.

Processing performed by ADS 202 (more specifically, compute assembly 210) in the present embodiment will be described below with reference to FIG. 3. FIG. 3 is a flowchart showing exemplary processing performed in ADS 202. ADS 202 repeatedly performs, for example, processing as below every API execution cycle.

In a step (the step being denoted as S below) 11, ADS 202 determines whether or not the autonomous state has been set to the autonomous mode. ADS 202 determines whether or not the autonomous state has been set to the autonomous mode, for example, based on a state of a flag that indicates the autonomous mode. The flag indicating the autonomous mode is turned on, for example, when an operation by a user onto HMI 230 for carrying out autonomous driving is accepted, and the flag is turned off when the autonomous mode is canceled by the operation performed by the user or in accordance with a driving condition and switching to the manual mode is made. When ADS 202 determines the autonomous state as having been set to the autonomous mode (YES in S11), the process makes transition to S12.

In S12, ADS 202 determines whether or not the acceleration command has a value representing deceleration. The acceleration command has an acceleration value or a deceleration value. For example, the acceleration command having a positive value indicates that VP 120 is requested by ADS 202 to accelerate vehicle 10. The acceleration command having a negative value indicates that VP 120 is requested by ADS 202 to decelerate vehicle 10. ADS 202 determines the acceleration command as having a value representing deceleration when the acceleration command has the negative value. When the ADS determines the acceleration command as having a value representing deceleration (YES in S12), the process makes transition to S13.

In S13, ADS 202 determines whether or not the actual moving direction of vehicle 10 exhibits the standstill state. ADS 202 obtains from VP 120, information on the actual moving direction of vehicle 10 as the vehicle state. For example, when a longitudinal velocity of vehicle 10 is zero based on a wheel speed obtained by wheel speed sensor 127 of VP 120, information that the actual moving direction exhibits the standstill state is provided as the vehicle state from VP 120 to ADS 202 through vehicle control interface 110. The longitudinal direction of vehicle 10 in the present embodiment corresponds, for example, to a direction of travel of vehicle 10. When the actual moving direction of vehicle 10 is determined as exhibiting the standstill state (YES in S13), the process makes transition to S14.

In S14, ADS 202 determines whether or not a wheel lock request is issued. For example, when the created driving plan includes a plan to immobilize vehicle 10, ADS 202 determines that the wheel lock request is issued. When the wheel lock request is determined as being issued (YES in S14), the process makes transition to S15.

In S15, ADS 202 sets the immobilization command to "Applied". VP 120 is requested to immobilize vehicle 10. Therefore, when the immobilization command is set to "Applied", the EPB and the P-Lock apparatus are controlled to be activated in VP 120 as will be described later.

In S16, ADS 202 sets V1 as the acceleration command. V1 represents a constant deceleration value. V1 is set, for example, to $-0.4$ m/s$^2$.

In S17, ADS 202 determines whether or not an immobilization status has been set to "11". The immobilization status is provided as one of vehicle states from VP 120 through vehicle control interface 110.

The immobilization status is set by combining a value representing a state of the EPB and a value representing a state of the P-Lock apparatus. When the value representing the state of the EPB is set to "1", it indicates that the EPB is in an activated state. When the value representing the state of the EPB is set to "0", it indicates that the EPB is in a deactivated state. Similarly, when the value representing the state of the P-Lock apparatus is set to "1", it indicates that the P-Lock apparatus is in the activated state. When the value representing the state of the P-Lock apparatus is set to "0", it indicates that the P-Lock apparatus is in the deactivated state. Therefore, for example, when the value representing the immobilization status is set to "11", it indicates that both of the EPB and the P-Lock apparatus are in the activated state. When the value representing the immobilization status is set to "00", it indicates that both of the EPB and the P-Lock apparatus are in the deactivated state. When the value representing the immobilization status is set to "10", it indicates that the EPB is in the activated state and the P-Lock apparatus is in the deactivated state. When the value representing the immobilization status is set to "01", it indicates that the EPB is in the deactivated state and the P-Lock apparatus is in the activated state. When the immobilization status is determined as being set to "11" (YES in S17), the process makes transition to S18.

In S18, ADS 202 sets the acceleration command to zero. In this case, vehicle 10 is controlled to maintain the standstill state.

When the autonomous state has not been set to the autonomous mode (NO in S11), when the acceleration command does not have a value representing deceleration (NO in S12), when the actual moving direction does not exhibit the standstill state (NO in S13), or when the wheel lock request is not issued (NO in S14), this process ends. When the immobilization status has not been set to "11" (NO in S17), the process returns to S17.

Figure 4:
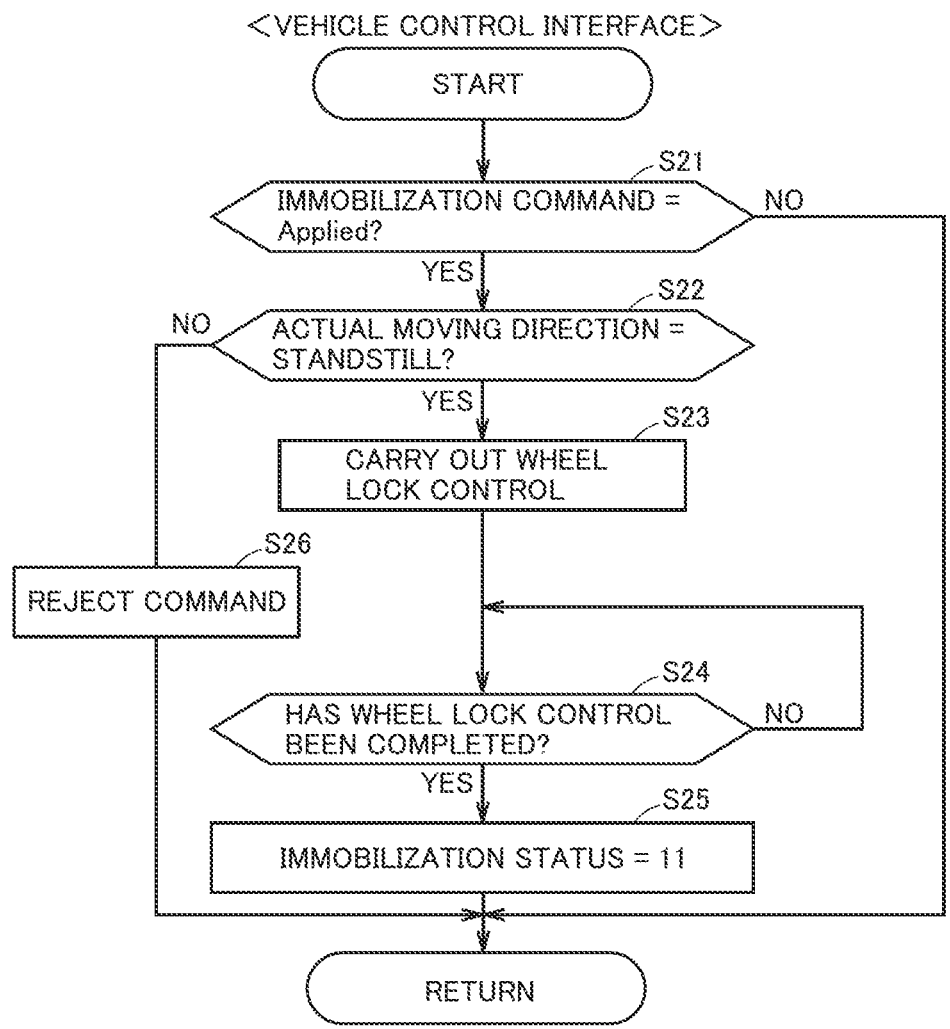
FIG. 4 is a flowchart showing exemplary processing performed in the vehicle control interface.

Processing performed by vehicle control interface 110 (more specifically, VCIB 111) will now be described with reference to FIG. 4. FIG. 4 is a flowchart showing exemplary processing performed in vehicle control interface 110. Vehicle control interface 110 repeatedly performs processing as below, for example, every API execution cycle.

In S21, vehicle control interface 110 determines whether or not the immobilization command is set to "Applied". When the immobilization command is determined as being set to "Applied" (YES in S21), the process makes transition to S22.

In S22, vehicle control interface 110 determines whether or not the actual moving direction of vehicle 10 exhibits the standstill state. When the actual moving direction of vehicle 10 is determined as exhibiting the standstill state (YES in S22), the process makes transition to S23.

In S23, vehicle control interface 110 carries out wheel lock control. Specifically, vehicle control interface 110 provides a control command that requests EPB system 123A to activate the EPB and provides a control command that requests P-Lock system 123B to activate the P-Lock apparatus (a control command that requests for setting of the shift range to the P range).

In S24, vehicle control interface 110 determines whether or not wheel lock control has been completed. When both of the EPB and P-Lock are in the activated state, vehicle control interface 110 determines wheel lock control as having been completed.

Vehicle control interface 110 may determine that the EPB is in the activated state, for example, when a prescribed time period has elapsed since it provided the control command requesting for activation of the EPB, or when an amount of activation of the actuator of the EPB has exceeded a threshold value.

Similarly, vehicle control interface 110 may determine that the P-Lock apparatus is in the activated state, for example, when a prescribed time period has elapsed since it provided the control command requesting for activation of the P-Lock apparatus or when an amount of activation of the actuator of the P-Lock apparatus has exceeded a threshold value. When wheel lock control is determined as having been completed (YES in S24), the process makes transition to S25.

In S25, vehicle control interface 110 sets "11" as the immobilization status. When the value representing the immobilization status has been set to "11", it indicates that both of the EPB and the P-Lock apparatus are in the activated state. Vehicle control interface 110 provides the set immobilization status as one of pieces of information included in the vehicle state to ADS 202. When the actual moving direction is determined as not exhibiting the standstill state (NO in S22), the process makes transition to S26.

In S26, vehicle control interface 110 rejects the command. Specifically, vehicle control interface 110 rejects the command by not carrying out wheel lock control even though the immobilization command has been set to "Applied". Vehicle control interface 110 may provide information indicating that wheel lock control is not carried out to ADS 202.

When the immobilization command is determined as not being set to "Applied" (NO in S21), this process ends. When wheel lock control is determined as not having been completed (NO in S24), the process returns to S24.

Figure 5:
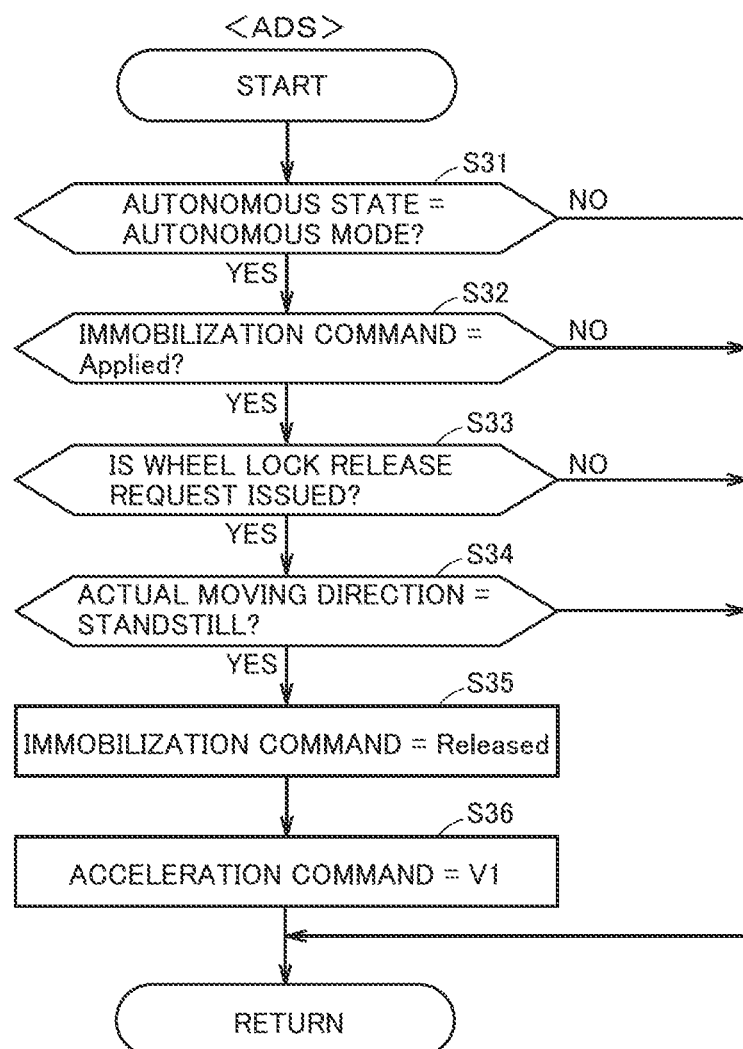
FIG. 5 is a flowchart showing exemplary processing performed in the ADS when a request for immobilization of the vehicle is made.

Processing performed in ADS 202 when a request for immobilization of vehicle 10 is made will now be described with reference to FIG. 5. FIG. 5 is a flowchart showing exemplary processing performed in ADS 202 when a request for immobilization of vehicle is made. ADS 202 repeatedly performs processing as below, for example, every API execution cycle.

In S31, ADS 202 determines whether or not the autonomous state has been set to the autonomous mode. Since the method of determining whether or not the autonomous state has been set to the autonomous mode is as described above, detailed description thereof will not be repeated. When the autonomous state is determined as having been set to the autonomous mode (YES in S31), the process makes transition to S32.

In S32, ADS 202 determines whether or not the immobilization command is set to "Applied" (that is, the request for immobilization of vehicle 10 is made). When the immobilization command is determined as being set to "Applied" (YES in S32), the process makes transition to S33.

In S33, ADS 202 determines whether or not a wheel lock release request is issued. For example, when the created driving plan includes a plan to have the vehicle travel, ADS 202 determines that a wheel lock release request is issued. When the wheel lock release request is determined as being issued (YES in S33), the process makes transition to S34.

In S34, ADS 202 determines whether or not the actual moving direction of vehicle 10 exhibits the standstill state. Since the method of determining whether or not the actual moving direction exhibits the standstill state is as described above, detailed description thereof will not be repeated. When the actual moving direction of vehicle 10 is determined as exhibiting the standstill state (YES in S34), the process makes transition to S35.

In S35, ADS 202 sets the immobilization command to "Released". VP 120 is requested to release immobilization of vehicle 10. When the immobilization command is set to "Released", both of the EPB and the P-Lock apparatus are controlled to the deactivated state as will be described later.

In S36, ADS 202 sets the acceleration command to zero. In this case, vehicle 10 is controlled to maintain the standstill state.

Figure 6:
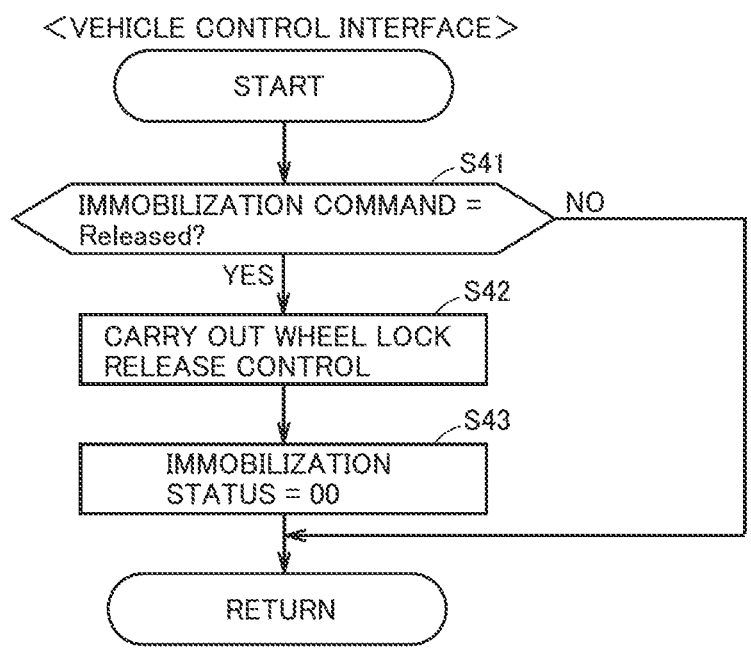
FIG. 6 is a flowchart showing exemplary processing performed in a vehicle control interface 110 when a request for immobilization of a vehicle 10 is made.

Processing performed by vehicle control interface 110 when a request for immobilization of vehicle 10 is made will now be described with reference to FIG. 6. FIG. 6 is a flowchart showing exemplary processing performed in vehicle control interface 110 when a request for immobilization of vehicle 10 is made. Vehicle control interface 110 repeatedly performs processing as below, for example, every API execution cycle.

In S41, vehicle control interface 110 determines whether or not the immobilization command is set to "Released". When the immobilization command is determined as being set to "Released" (YES in S41), the process makes transition to S42.

In S42, vehicle control interface 110 carries out wheel lock release control. Specifically, vehicle control interface 110 provides a control command requesting EPB system 123A to deactivate the EPB and provides a control command requesting P-Lock system 123B to deactivate the P-Lock apparatus (for example, a control command requesting for setting of the shift range to a non-P range (for example, the N range, the D range, or the R range)).

In S43, vehicle control interface 110 sets the immobilization status to "00". When the value representing the immobilization status is set to "00", it indicates that both of the EPB and the P-Lock apparatus are in the deactivated state. Vehicle control interface 110 provides the set immobilization status as one of pieces of information included in the vehicle state to ADS 202.

Figure 7:
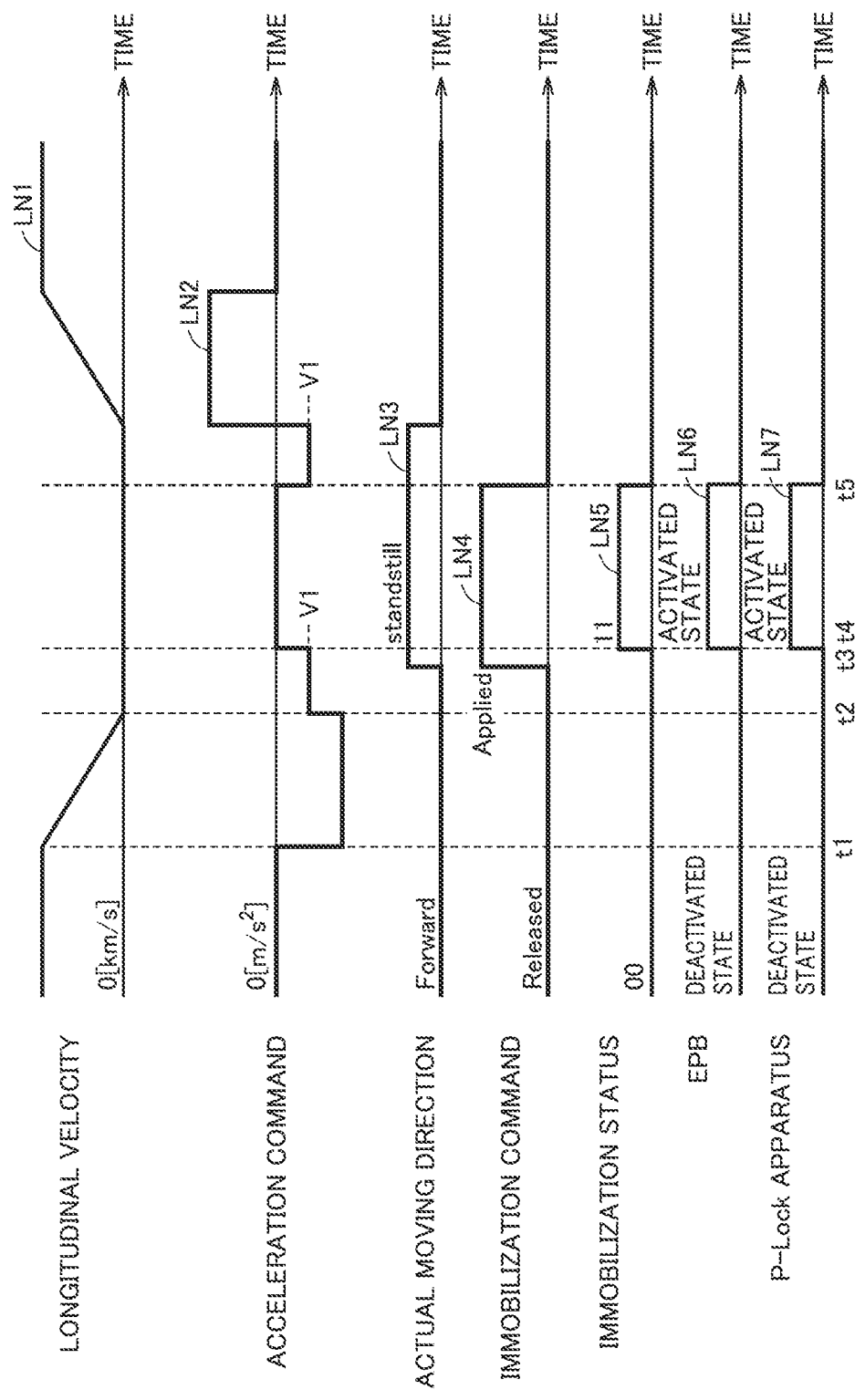
FIG. 7 is a timing chart for illustrating operations by the ADS, the vehicle control interface, and the VP.

Operations by ADS 202, vehicle control interface 110, and VP 120 based on the structure and the flowchart as set forth above will be described with reference to FIG. 7. FIG. 7 is a timing chart for illustrating operations by ADS 202, vehicle control interface 110, and VP 120. The abscissa in FIG. 7 represents time. LN1 in FIG. 7 represents variation in longitudinal velocity. LN2 in FIG. 7 represents variation in acceleration command. LN3 in FIG. 7 represents variation in actual moving direction. LN4 in FIG. 7 represents variation in immobilization command. LN5 in FIG. 7 represents variation in immobilization status. LN6 in FIG. 7 represents variation in state of the EPB. LN7 in FIG. 7 represents variation in state of the P-Lock apparatus.

For example, vehicle 10 during autonomous driving is assumed as traveling at a constant velocity as shown with LN1 in FIG. 7. At this time, a value representing the acceleration command is assumed to be zero as shown with LN2 in FIG. 7. The actual moving direction is assumed as a forward travel direction as shown with LN3 in FIG. 7. The immobilization command is assumed as having been set to "Released" as shown with LN4 in FIG. 7. The immobilization status is assumed as having been set to "00" as shown with LN5 in FIG. 7 and the EPB and the P-Lock apparatus are both assumed as being in the deactivated state as shown with LN6 and LN7 in FIG. 7.

When the driving plan created by ADS 202 includes a deceleration plan at time t1 as shown with LN2 in FIG. 7, the acceleration command has a value representing deceleration in accordance with the driving plan. Therefore, the longitudinal velocity starts to decrease from time t1 as shown with LN1 in FIG. 7.

When the autonomous state has been set to the autonomous mode (YES in S11) and the acceleration command has the value representing deceleration (YES in S12), whether or not the actual moving direction exhibits a standstill state is determined (S13).

When the longitudinal velocity attains to zero at time t2 as shown with LN1 in FIG. 7, the actual moving direction exhibits the standstill state as shown with LN3 in FIG. 7.

When the actual moving direction exhibits the standstill state at time t3 (YES in S13) and a wheel lock request is issued (YES in S14), the immobilization command is set to "Applied" as shown with LN4 in FIG. 7 (S14). Then, constant deceleration value V1 is set as the acceleration command as shown with LN2 in FIG. 7 (S15).

When the immobilization command is set to "Applied" (YES in S21) and the actual moving direction exhibits the standstill state (YES in S22), wheel lock control is carried out (S23). The EPB and the P-Lock apparatus are thus both controlled to the activated state. As both of the EPB and the P-Lock apparatus enter the activated state as shown with LN6 and LN7 in FIG. 7 to complete wheel lock control (YES in S24), the immobilization status is set to "11" as shown with LN5 in FIG. 7 (S25).

When the immobilization status is set to "11" at time t4 (YES in S16), the value of the acceleration command is set to zero.

When the autonomous state is set to the autonomous mode at time t5 (YES in S31) and the immobilization command is set to "Applied" (YES in S32), whether or not a wheel lock release request is issued is determined (S33).

When the driving plan created by ADS 202 includes a plan to release immobilization of vehicle 10, a wheel lock release request is made in accordance with the driving plan (YES in S33). Therefore, since the actual moving direction exhibits the standstill state as shown with LN3 in FIG. 7 (YES in S34), the immobilization command is set to "Released" as shown with LN4 in FIG. 7 (S35). Then, constant deceleration value V1 is set as the acceleration command as shown with LN2 in FIG. 7 (S36).

When the immobilization command is set to "Released" (YES in S41), wheel lock release control is carried out (S42). Therefore, the EPB and the P-Lock apparatus are both controlled to the deactivated state as shown with LN6 and LN7 in FIG. 7 and the immobilization status is set to "00" as shown with LN5 in FIG. 7 (S43).

As set forth above, according to vehicle 10 in the present embodiment, after the actual moving direction exhibits the standstill state, the wheels of vehicle 10 are fixed in response to the immobilization command. Therefore, when vehicle 10 comes to a standstill, the wheels can be fixed by the EPB and P-Lock at appropriate timing. Therefore, a vehicle on which the autonomous driving system can be mounted, the vehicle fixing the wheels at appropriate timing during autonomous driving, can be provided.

A request for value V1 (−0.4 m/s') representing the acceleration command is made until the immobilization command is set to "Applied". Therefore, movement of vehicle 10 can be restricted for a period until vehicle 10 is immobilized.

In releasing immobilization of vehicle 10, while vehicle 10 is in the standstill state, a request for release of immobilization of vehicle 10 is made in the immobilization command and a request for deceleration is made in the acceleration command. Therefore, movement of vehicle 10 can be restricted for a period until immobilization of vehicle 10 is released.

When a request for immobilization of vehicle 10 is made in the immobilization command while vehicle 10 is traveling, the request is rejected. Therefore, immobilization (that is, wheel lock control) of vehicle 10 while vehicle 10 is traveling can be suppressed.

When one of the request for immobilization of vehicle 10 and the request for release of immobilization of the vehicle is made in the immobilization command, in parallel to that request, a request for constant value V1 (−0.4 m/s") is made in the acceleration command. Therefore, movement of vehicle 10 can be restricted for a period until vehicle 10 is immobilized or immobilization of vehicle 10 is released.

When vehicle 10 has come to the standstill, by transmitting and receiving various commands such as the acceleration command or the immobilization command or the vehicle state such as the actual moving direction between ADS 202 and VP 120 through vehicle control interface 110, the wheels can be fixed by the EPB or the P-Lock apparatus at appropriate timing.

A modification will be described below.

In the embodiment described above, though VCIB 111 is described as performing the processing shown in the flowchart in FIG. 4 and the processing shown in the flowchart in FIG. 6, for example, VCIBs 111 and 112 may perform the processing described above in coordination.

In the embodiment described above, though vehicle control interface 110 is described as performing the processing shown in the flowchart in FIG. 4 and the processing shown in the flowchart in FIG. 6, for example, each system (specifically, EPB system 123A and P-Lock system 123B) to be controlled by VP 120 may perform a part or the entirety of the processing described above.

The entirety or a part of the modification above may be carried out as being combined as appropriate.

Example 1

Toyota's MaaS Vehicle Platform
API Specification
  for ADS Developers
  [Standard Edition #0.1]
History of Revision

TABLE 1

| Date of Revision | ver. | Summary of Revision | Reviser |
| --- | --- | --- | --- |
| 2019 May 4 | 0.1 | Creating a new material | MaaS Business Div. |

Index
  1. Outline 4
    1.1. Purpose of this Specification 4
    1.2. Target Vehicle 4
    1.3. Definition of Term 4
    1.4. Precaution for Handling 4
  2. Structure 5
    2.1. Overall Structure of MaaS 5
    2.2. System structure of MaaS vehicle 6
  3. Application Interfaces 7
    3.1. Responsibility sharing of when using APIs 7
    3.2. Typical usage of APIs 7
    3.3. APIs for vehicle motion control 9
      3.3.1. Functions 9
      3.3.2. Inputs 16
      3.3.3. Outputs 23
    3.4. APIs for BODY control 45
      3.4.1. Functions 45
      3.4.2. Inputs 45
      3.4.3. Outputs 56
    3.5. APIs for Power control 68
      3.5.1. Functions 68
      3.5.2. Inputs 68
      3.5.3. Outputs 69
    3.6. APIs for Safety 70
      3.6.1. Functions 70
      3.6.2. Inputs 70
      3.6.3. Outputs 70
    3.7. APIs for Security 74
      3.7.1. Functions 74
      3.7.2. Inputs 74
      3.7.3. Outputs 76
    3.8. APIs for MaaS Service 80
      3.8.1. Functions 80
      3.8.2. Inputs 80
      3.8.3. Outputs 80
1. Outline
  1.1. Purpose of this Specification
    This document is an API specification of Toyota Vehicle Platform and contains the outline, the usage and the caveats of the application interface.
  1.2. Target Vehicle
    e-Palette, MaaS vehicle based on the POV (Privately Owned Vehicle) manufactured by Toyota 1.3. Definition of Term

TABLE 2

| Term | Definition |
| --- | --- |
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

Figure 8:
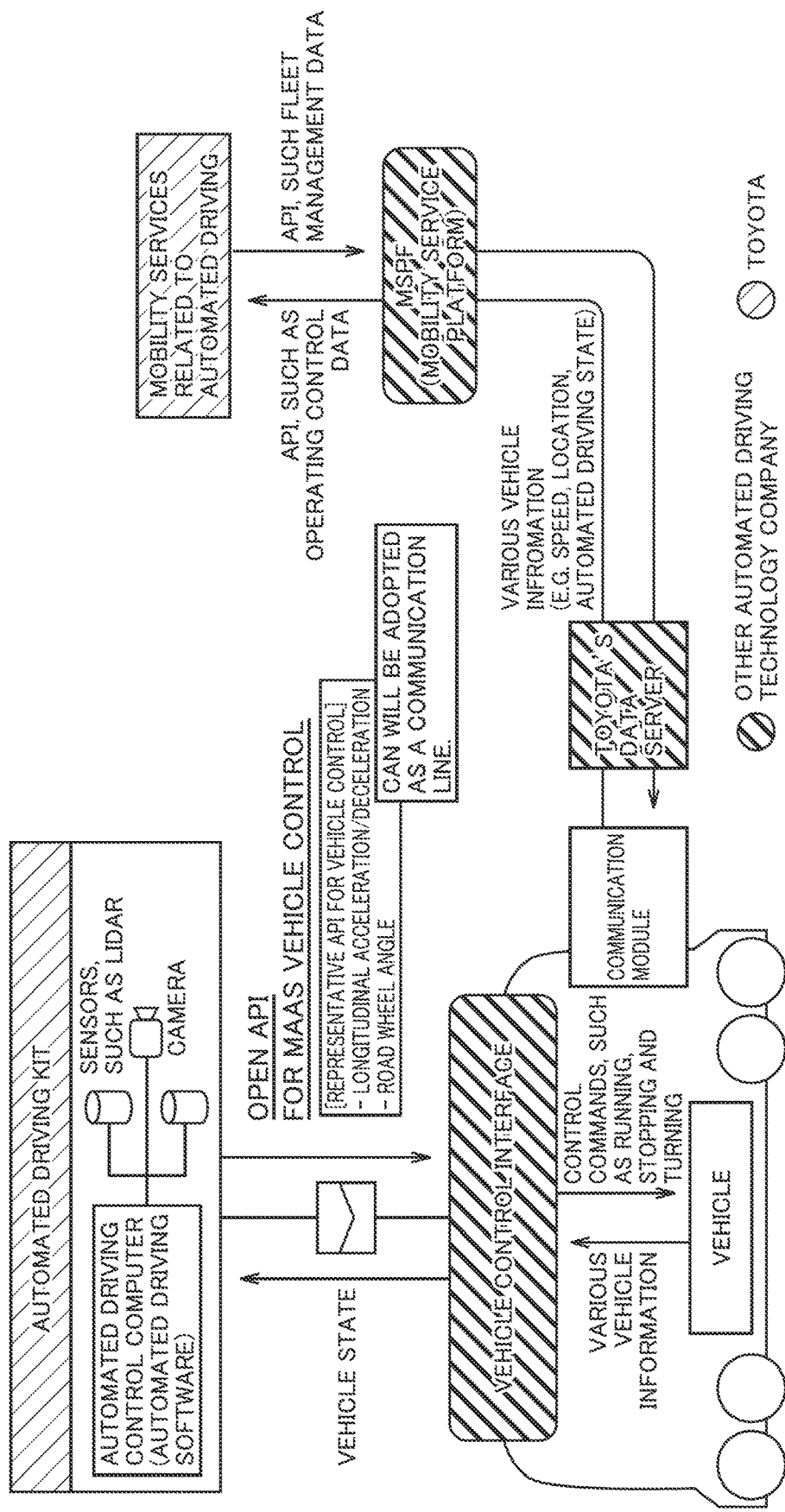
FIG. 8 is a diagram of an overall configuration of MaaS.

1.4. Precaution for Handling
    This is an early draft of the document.
    All the contents are subject to change. Such changes are notified to the users. Please note that some parts are still T.B.D. will be updated in the future.
2. Structure
  2.1. Overall Structure of MaaS
    The overall structure of MaaS with the target vehicle is shown (FIG. 8).
    Vehicle control technology is being used as an interface for technology providers.
    Technology providers can receive open API such as vehicle state and vehicle control, necessary for development of automated driving systems.
  2.2. System Structure of MaaS Vehicle
    The system architecture as a premise is shown (FIG. 9).
    The target vehicle will adopt the physical architecture of using CAN for the bus between ADS and VCIB. In order to realize each API in this document, the CAN frames and the bit assignments are shown in the form of "bit assignment table" as a separate document.
3. Application Interfaces
    3.1. Responsibility Sharing of when Using APIs
    Basic responsibility sharing between ADS and vehicle VP is as follows when using APIs.
    [ADS]
    The ADS should create the driving plan, and should indicate vehicle control values to the VP.
    [VP]
    The Toyota VP should control each system of the VP based on indications from an ADS.
    3.2. Typical Usage of APIs
    In this section, typical usage of APIs is described.
    CAN will be adopted as a communication line between ADS and VP. Therefore, basically, APIs should be executed every defined cycle time of each API by ADS.
    A typical workflow of ADS of when executing APIs is as follows (FIG. 10).
    3.3. APIs for Vehicle Motion Control
    In this section, the APIs for vehicle motion control which is controllable in the MaaS vehicle is described.
    3.3.1. Functions
      3.3.1.1. Standstill, Start Sequence
      The transition to the standstill (immobility) mode and the vehicle start sequence are described. This function presupposes the vehicle is in Autonomy_State=Autonomous Mode. The request is rejected in other modes.
      The below diagram shows an example.
      Acceleration Command requests deceleration and stops the vehicle. Then, when Longitudinal_Velocity is confirmed as 0 [km/h], Standstill Command="Applied" is sent. After the brake hold control is finished, Standstill Status becomes "Applied". Until then, Acceleration Command has to continue deceleration request. Either Standstill Command="Applied" or Acceleration Command's deceleration request were canceled, the transition to the brake hold control will not happen. After that, the vehicle continues to be standstill as far as Standstill Command="Applied" is being sent. Acceleration Command can be set to 0 (zero) during this period.

If the vehicle needs to start, the brake hold control is cancelled by setting Standstill Command to "Released". At the same time, acceleration/deceleration is controlled based on Acceleration Command (FIG. 11).

EPB is engaged when Standstill Status="Applied" continues for 3 minutes.

3.3.1.2. Direction Request Sequence

The shift change sequence is described. This function presupposes that Autonomy_State=Autonomous Mode. Otherwise, the request is rejected.

Shift change happens only during Actual_Moving_Direction="standstill". Otherwise, the request is rejected.

In the following diagram shows an example. Acceleration Command requests deceleration and makes the vehicle stop. After Actual_Moving_Direction is set to "standstill", any shift position can be requested by Propulsion Direction Command. (In the example below, "D"→"R").

During shift change, Acceleration Command has to request deceleration.

After the shift change, acceleration/deceleration is controlled based on Acceleration Command value (FIG. 12).

3.3.1.3. WheelLock Sequence

The engagement and release of wheel lock is described. This function presupposes Autonomy_State=Autonomous Mode, otherwise the request is rejected.

This function is conductible only during vehicle is stopped. Acceleration Command requests deceleration and makes the vehicle stop. After Actual_Moving_Direction is set to "standstill", WheelLock is engaged by Immobilization Command="Applied". Acceleration Command is set to Deceleration until Immobilization Status is set to "Applied".

If release is desired, Immobilization Command="Release" is requested when the vehicle is stationary. Acceleration Command is set to Deceleration at that time.

Figure 13:
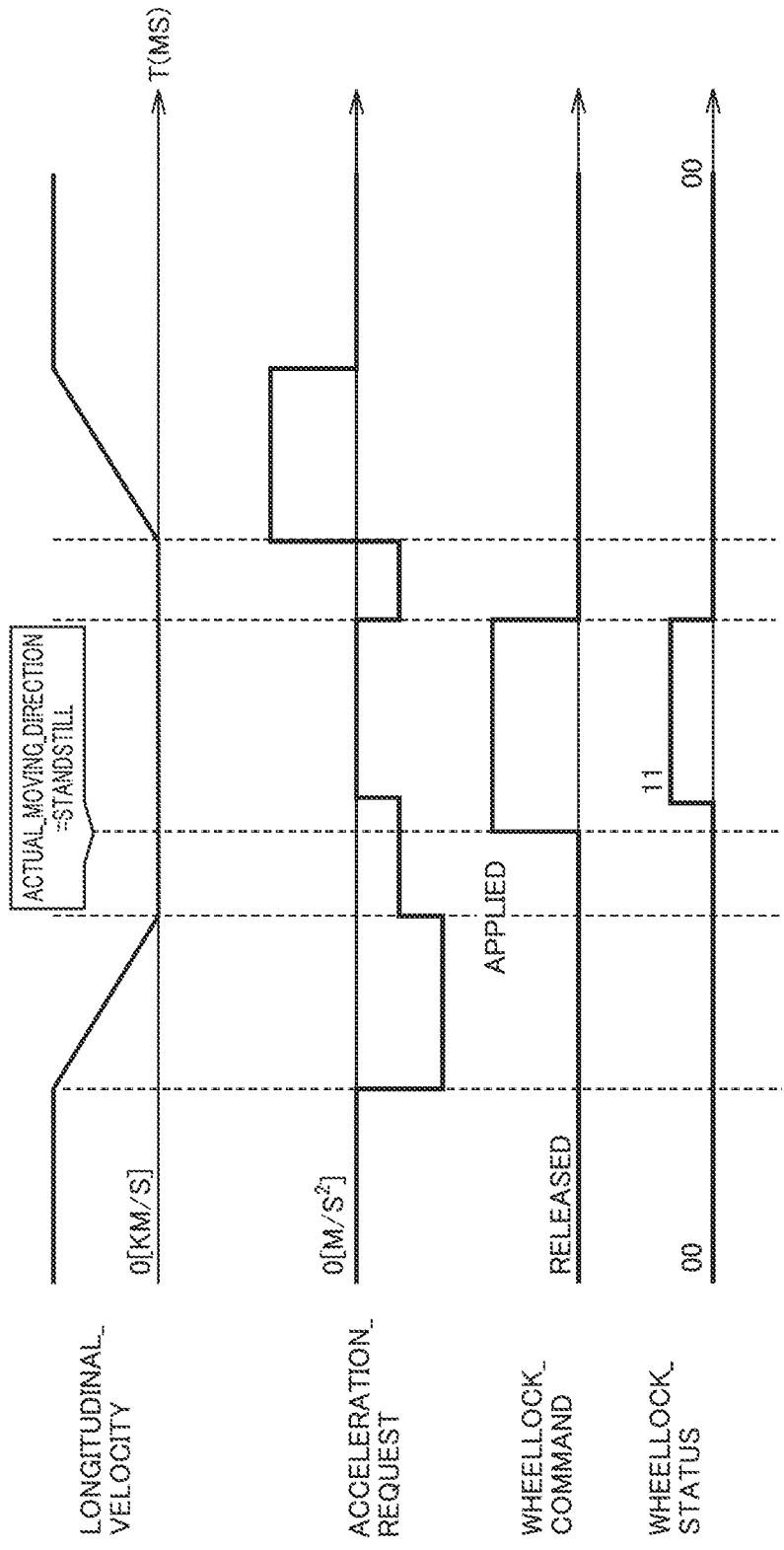
FIG. 13 is a diagram showing an exemplary timing chart of the API relating to wheel lock of the MaaS vehicle.

After this, the vehicle is accelerated/decelerated based on Acceleration Command value (FIG. 13).

3.3.1.4. Road_Wheel_Angle Request

This function presupposes Autonomy_State="Autonomous Mode", and the request is rejected otherwise.

Tire Turning Angle Command is the relative value from Estimated_Road_Wheel_Angle_Actual.

For example, in case that Estimated_Road_Wheel_Angle_Actual=0.1 [rad] while the vehicle is going straight;

If ADS requests to go straight ahead, Tire Turning Angle Command should be set to 0+0.1=0.1 [rad].

If ADS requests to steer by −0.3 [rad], Tire Turning Angle Command should be set to −0.3+0.1=−0.2 [rad].

3.3.1.5. Rider Operation

3.3.1.5.1. Acceleration Pedal Operation

While in Autonomous driving mode, accelerator pedal stroke is eliminated from the vehicle acceleration demand selection.

3.3.1.5.2. Brake Pedal Operation

The action when the brake pedal is operated. In the autonomy mode, target vehicle deceleration is the sum of 1) estimated deceleration from the brake pedal stroke and 2) deceleration request from AD system.

3.3.1.5.3. Shift_Lever_Operation

In Autonomous driving mode, driver operation of the shift lever is not reflected in Propulsion Direction Status.

If necessary, ADS confirms Propulsion Direction by Driver and changes shift position by using Propulsion Direction Command.

3.3.1.5.4. Steering Operation

When the driver (rider) operates the steering, the maximum is selected from 1) the torque value estimated from driver operation angle, and 2) the torque value calculated from requested wheel angle.

Note that Tire Turning Angle Command is not accepted if the driver strongly turns the steering wheel. The above-mentioned is determined by Steering_Wheel_Intervention flag.

3.3.2. Inputs

TABLE 3

| Signal Name | Description | Redundancy |
|---|---|---|
| Propulsion Direction Command | Request to switch between forward (D range) and back (R range) | N/A |
| Immobilization Command | Request to engage/release WheelLock | Applied |
| Standstill Command | Request to maintain stationary | Applied |
| Acceleration Command | Request to accelerate/decelerate | Applied |
| Tire Turning Angle Command | Request front wheel angle | Applied |
| Autonomization Command | Request to transition between manual mode and autonomy mode | Applied |

3.3.2.1. Propulsion Direction Command

Request to switch between forward (D range) and back (R range)

Values

TABLE 4

| value | Description | Remarks |
|---|---|---|
| 0 | No Request | |
| 2 | R | Shift to R range |
| 4 | D | Shift to D range |
| other | Reserved | |

Remarks

Only available when Autonomy_State="Autonomous Mode"

D/R is changeable only the vehicle is stationary (Actual_Moving_Direction="standstill").

The request while driving (moving) is rejected.

When system requests D/R shifting, Acceleration Command is sent deceleration (−0.4 m/s$^2$) simultaneously. (Only while brake is applied.)

The request may not be accepted in following cases.

Direction_Control_Degradation_Modes="Failure detected"

3.3.2.2. Immobilization Command
Request to engage/release WheelLock

Values

TABLE 5

| value | Description | Remarks |
|---|---|---|
| 0 | No Request | |
| 1 | Applied | EPB is turned on and TM shifts to P range |
| 2 | Released | EPB is turned off and TM shifts to the value of Propulsion Direction Command |

Remarks
- Available only when Autonomy_State="Autonomous Mode"
- Changeable only when the vehicle is stationary (Actual_Moving_Direction="standstill")
- The request is rejected when vehicle is running.
- When Apply/Release mode change is requested, Acceleration Command is set to deceleration (−0.4 m/s$^2$). (Only while brake is applied.)

3.3.2.3. Standstill Command
Request the Vehicle to be Stationary

Values

TABLE 6

| value | Description | Remarks |
|---|---|---|
| 0 | No Request | |
| 1 | Applied | Standstill is requested |
| 2 | Released | |

Remarks
- Only available when Autonomy_State="Autonomous Mode"
- Confirmed by Standstill Status="Applied"
- When the vehicle is stationary (Actual_Moving_Direction="standstill"), transition to Stand Still is enabled.
- Acceleration Command has to be continued until Standstill Status becomes "Applied" and Acceleration Command's deceleration request (−0.4 m/s$^2$) should be continued.
- There are more cases where the request is not accepted. Details are T.B.D.

3.3.2.4. Acceleration Command
Command Vehicle Acceleration

Values

Estimated_Max_Decel_Capability to Estimated_Max_Accel_Capability [m/s$^2$]

Remarks
- Only available when Autonomy_State="Autonomous Mode"
- Acceleration (+) and deceleration (−) request based on Propulsion Direction Status direction
- The upper/lower limit will vary based on Estimated_Max_Decel_Capability and Estimated_Max_Accel_Capability.
- When acceleration more than Estimated_Max_Accel_Capability is requested, the request is set to Estimated_Max_Accel_Capability.
- When deceleration more than Estimated_Max_Decel_Capability is requested, the request is set to Estimated_Max_Decel_Capability.
- Depending on the accel/brake pedal stroke, the requested acceleration may not be met. See 3.4.1.4 for more detail.
- When Pre-Collision system is activated simultaneously, minimum acceleration (maximum deceleration) is selected.

3.3.2.5. Tire Turning Angle Command
Command Tire Turning Angle

Values

TABLE 7

| value | Description | Remarks |
|---|---|---|
| — | [unit: rad] | |

Remarks
- Left is positive value (+). Right is negative value (−).
- Available only when Autonomy_State="Autonomous Mode"
- The output of Estimated_Road_Wheel_Angle_Actual when the vehicle is going straight, is set to the reference value (0).
- This requests relative value of Estimated_Road_Wheel_Angle_Actual. (See 3.4.1.1 for details)
- The requested value is within Current_Road_Wheel_Angle_Rate_Limit.
- The requested value may not be fulfilled depending on the steer angle by the driver.

3.3.2.6. Autonomization Command
Request to transition between manual mode and autonomy mode Values

TABLE 8

| value | Description | Remarks |
|---|---|---|
| 00b | No Request For Autonomy | |
| 01b | Request For Autonomy | |
| 10b | Deactivation Request | means transition request to manual mode |

The mode may be able not to be transitioned to Autonomy mode. (e.g. In case that a failure occurs in the vehicle platform.)

3.3.3. Outputs

TABLE 9

| Signal Name | Description | Redundancy |
|---|---|---|
| Propulsion Direction Status | Current shift range | N/A |
| Propulsion Direction by Driver | Shift lever position by driver | N/A |
| Immobilization Status | Output of EPB and Shift P | Applied |
| Immobilization Request by Driver | EPB switch status by driver | N/A |
| Standstill Status | Stand still status | N/A |
| Estimated_Coasting_Rate | Estimated vehicle deceleration when throttle is closed | N/A |

TABLE 9-continued

| Signal Name | Description | Redundancy |
| --- | --- | --- |
| Estimated_Max_Accel_Capability | Estimated maximum acceleration | Applied |
| Estimated_Max_Decel_Capability | Estimated maximum deceleration | Applied |
| Estimated_Road_Wheel_Angle_Actual | Front wheel steer angle | Applied |
| Estimated_Road_Wheel_Angle_Rate_Actual | Front wheel steer angle rate | Applied |
| Steering_Wheel_Angle_Actual | Steering wheel angle | N/A |
| Steering_Wheel_Angle_Rate_Actual | Steering wheel angle rate | N/A |
| Current_Road_Wheel_Angle_Rate_Limit | Road wheel angle rate limit | Applied |
| Estimated_Max_Lateral_Acceleration_Capability | Estimated max lateral acceleration | Applied |
| Estimated_Max_Lateral_Acceleration_Rate_Capability | Estimated max lateral acceleration rate | Applied |
| Accelerator_Pedal_Position | Position of the accelerator pedal (How much is the pedal depressed?) | N/A |
| Accelerator_Pedal_Intervention | This signal shows whether the accelerator pedal is depressed by a driver (intervention) | N/A |
| Brake_Pedal_Position | Position of the brake pedal (How much is the pedal depressed?) | T.B.D. |
| Brake_Pedal_Intervention | This signal shows whether the brake pedal is depressed by a driver (intervention) | T.B.D. |
| Steering_Wheel_Intervention | This signal shows whether the steering wheel is turned by a driver (intervention) | T.B.D. |
| Shift_Lever_Intervention | This signal shows whether the shift lever is controlled by a driver (intervention) | T.B.D. |
| WheelSpeed_FL | wheel speed value (Front Left Wheel) | N/A |
| WheelSpeed_FL_Rotation | Rotation direction of wheel (Front Left) | N/A |
| WheelSpeed_FR | wheel speed value (Front Right Wheel) | N/A |
| WheelSpeed_FR_Rotation | Rotation direction of wheel (Front Right) | N/A |
| WheelSpeed_RL | wheel speed value (Rear Left Wheel) | Applied |
| WheelSpeed_RL_Rotation | Rotation direction of wheel (Rear Left) | Applied |
| WheelSpeed_RR | wheel speed value (Rear Right Wheel) | Applied |
| WheelSpeed_RR_Rotation | Rotation direction of wheel (Rear Right) | Applied |
| Actual_Moving_Direction | Moving direction of vehicle | Applied |
| Longitudinal_Velocity | Estimated longitudinal velocity of vehicle | Applied |
| Longitudinal_Acceleration | Estimated longitudinal acceleration of vehicle | Applied |
| Lateral_Acceleration | Sensor value of lateral acceleration of vehicle | Applied |
| Yawrate | Sensor value of Yaw rate | Applied |
| Autonomy_State | State of whether autonomy mode or manual mode | Applied |
| Autonomy_Ready | Situation of whether the vehicle can transition to autonomy mode or not | Applied |
| Autonomy_Fault | Status of whether the fault regarding a functionality in autonomy mode occurs or not | Applied |

3.3.3.1. Propulsion Direction Status

Current Shift Range

Values

TABLE 10

| value | Description | remarks |
| --- | --- | --- |
| 0 | Reserved | |
| 1 | P | |
| 2 | R | |
| 3 | N | |
| 4 | D | |
| 5 | B | |
| 6 | Reserved | |
| 7 | Invalid value | |

When the shift range is indeterminate, this output is set to "Invalid Value".

When the vehicle becomes the following status during VO mode, [Propulsion

Direction Status] will turn to "P".

[Longitudinal_Velocity]=0 [km/h]

[Brake_Pedal_Position]<Threshold value (T.B.D.) (in case of being determined that the pedal isn't depressed)

[1st_Left_Seat_Belt_Status]=Unbuckled

[1st_Left_Door_Open_Status]=Opened 3.3.3.2. Propulsion Direction by Driver

Shift Lever Position by Driver Operation

Values

TABLE 11

| value | Description | remarks |
| --- | --- | --- |
| 0 | No Request | |
| 1 | P | |
| 2 | R | |
| 3 | N | |
| 4 | D | |
| 5 | B | |
| 6 | Reserved | |
| 7 | Invalid value | |

Remarks

Output based on the lever position operated by driver

If the driver releases his hand of the shift lever, the lever returns to the central position and the output is set as "No Request".

When the vehicle becomes the following status during NVO mode, [Propulsion Direction by Driver] will turn to "1(P)".

[Longitudinal_Velocity]=0 [km/h]

[Brake_Pedal_Position]<Threshold value (T.B.D.) (in case of being determined that the pedal isn't depressed)

[1st_Left_Seat_Belt_Status]=Unbuckled

[1st_Left_Door_Open_Status]=Opened

3.3.3.3. Immobilization Status
Output EPB and Shift-P Status
Values
<Primary>

TABLE 12

| Value | | | |
|---|---|---|---|
| Shift | EPB | Description | Remarks |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

<Secondary>

TABLE 13

| Value | | | |
|---|---|---|---|
| Shift | | Description | Remarks |
| 0 | 0 | Other than Shift P | |
| 1 | 0 | Shift P | |
| 0 | 1 | Reserved | |
| 1 | 1 | Reserved | |

Remarks
  Secondary signal does not include EPB lock status.
3.3.3.4. Immobilization Request by Driver
Driver Operation of EPB Switch
Values

TABLE 14

| value | Description | remarks |
|---|---|---|
| 0 | No Request | |
| 1 | Engaged | |
| 2 | Released | |
| 3 | Invalid value | |

Remarks
  "Engaged" is outputted while the EPB switch is being pressed.
  "Released" is outputted while the EPB switch is being pulled.
3.3.3.5. Standstill Status
Vehicle Stationary Status
Values

TABLE 15

| Value | Description | remarks |
|---|---|---|
| 0 | Released | |
| 1 | Applied | |
| 2 | Reserved | |
| 3 | Invalid value | |

Remarks
  When Standstill Status=Applied continues for 3 minutes, EPB is activated.
  If the vehicle is desired to start, ADS requests Standstill Command="Released".
3.3.3.6. Estimated_Coasting_Rate
Estimated Vehicle Deceleration when Throttle is Closed
Values
[unit: m/s$^2$]
Remarks
  Estimated acceleration at WOT is calculated.
  Slope and road load etc. are taken into estimation.
  When the Propulsion Direction Status is "D", the acceleration to the forward direction shows a positive value.
  When the Propulsion Direction Status is "R", the acceleration to the reverse direction shows a positive value.
3.3.3.7. Estimated_Max_Accel_Capability
Estimated Maximum Acceleration
Values
[unit: m/s$^2$]
Remarks
  The acceleration at WOT is calculated.
  Slope and road load etc. are taken into estimation.
  The direction decided by the shift position is considered to be plus.
3.3.3.8. Estimated_Max_Decel_Capability
Estimated Maximum Deceleration
Values
−9.8 to 0 [unit: m/s$^2$]
Affected by Brake_System_Degradation_Modes. Details are T.B.D.
Based on vehicle state or road condition, cannot output in some cases
3.3.3.9. Estimated_Road_Wheel_Angle_Actual
Front Wheel Steer Angle
Values

TABLE 16

| value | Description | Remarks |
|---|---|---|
| others | [unit: rad] | |
| Minimum Value | Invalid value | The sensor is invalid. |

Remarks
  Left is positive value (+). Right is negative value (−).
  Before "the wheel angle when the vehicle is going straight" becomes available, this signal is Invalid value.
3.3.3.10. Estimated_Road_Wheel_Angle_Rate_Actual
Front Wheel Steer Angle Rate
Values

TABLE 17

| value | Description | Remarks |
|---|---|---|
| others | [unit: rad/s] | |
| Minimum Value | Invalid value | |

Remarks
  Left is positive value (+). Right is negative value (−).
3.3.3.11. Steering_Wheel_Angle_Actual
Steering Wheel Angle
Values

TABLE 18

| Value | Description | Remarks |
|---|---|---|
| others | [unit: rad] | |
| Minimum Value | Invalid value | |

Remarks
  Left is positive value (+). Right is negative value (−).
  The steering angle converted from the steering assist motor angle Before "the wheel angle when the vehicle is going straight" becomes available, this signal is Invalid value.

3.3.3.12. Steering_Wheel_Angle_Rate_Actual

Steering Wheel Angle Rate

Values

TABLE 19

| Value | Description | Remarks |
|---|---|---|
| others | [unit: rad/s] | |
| Minimum Value | Invalid value | |

Remarks

Left is positive value (+). Right is negative value (−).

The steering angle rate converted from the steering assist motor angle rate 3.3.3.13. Current_Road_Wheel_Angle_Rate_Limit Road Wheel Angle Rate Limit Values When stopped: 0.4 [rad/s]

While running: Show "Remarks"

Remarks

Calculated from the "vehicle speed–steering angle rate" chart like below

A) At a very low speed or stopped situation, use fixed value of 0.4 [rad/s]

Figure 14:
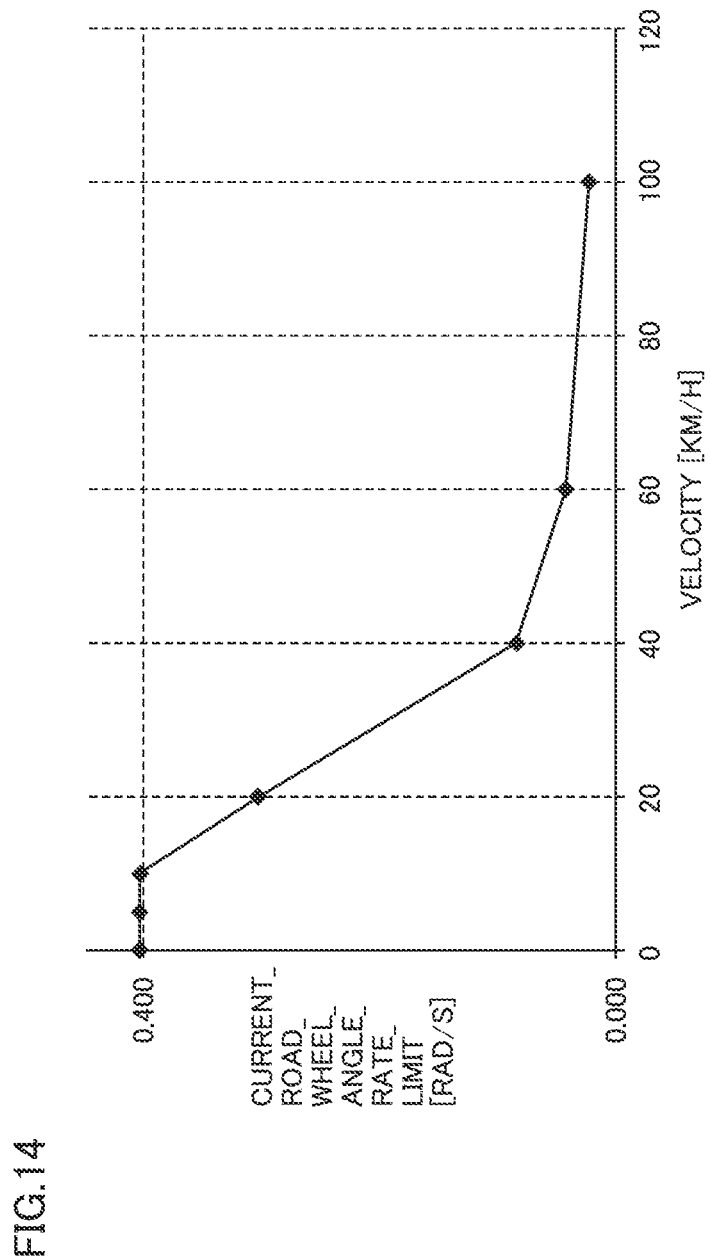
FIG. 14 is a diagram showing a limit value of variation in tire turning angle.

B) At a higher speed, the steering angle rate is calculated from the vehicle speed using 2.94 m/s$^3$ The threshold speed between A and B is 10 [km/h] (FIG. 14).

3.3.3.14. Estimated_Max_Lateral_Acceleration_Capability

Estimated Max Lateral Acceleration

Values 2.94 [unit: m/s$^2$] fixed value

Remarks

Wheel Angle controller is designed within the acceleration range up to 2.94 m/s$^2$.

3.3.3.15. Estimated_Max_Lateral_Acceleration_Rate_Capability

Estimated Max Lateral Acceleration Rate

Values 2.94 [unit: m/s$^3$] fixed value

Remarks

Wheel Angle controller is designed within the acceleration range up to 2.94 m/s$^3$.

3.3.3.16. Accelerator_Pedal_Position

Position of the Accelerator Pedal (how Much is the Pedal Depressed?)

Values 0 to 100 [unit: %]

Remarks

In order not to change the acceleration openness suddenly, this signal is filtered by smoothing process.

In normal condition

The accelerator position signal after zero point calibration is transmitted.

In failure condition

Transmitted failsafe value (0xFF)

3.3.3.17. Accelerator_Pedal_Intervention

This signal shows whether the accelerator pedal is depressed by a driver (intervention).

Values

TABLE 20

| Value | Description | Remarks |
|---|---|---|
| 0 | Not depressed | |
| 1 | depressed | |
| 2 | Beyond autonomy acceleration | |

Remarks

When Accelerator_Pedal_Position is higher than the defined threshold value (ACCL_INTV), this signal [Accelerator_Pedal_Intervention] will turn to "depressed".

When the requested acceleration from depressed acceleration pedal is higher than the requested acceleration from system (ADS, PCS etc.), this signal will turn to "Beyond autonomy acceleration".

During NVO mode, accelerator request will be rejected. Therefore, this signal will not turn to "2".

Figure 15:
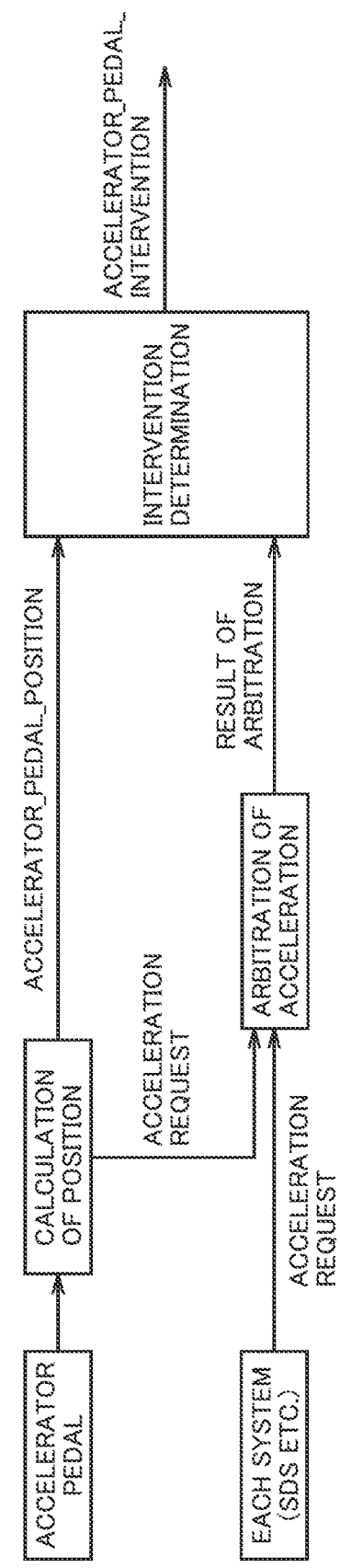
FIG. 15 is a diagram illustrating intervention by an accelerator pedal.

Detail Design (FIG. 15)

3.3.3.18. Brake_Pedal_Position

Position of the Brake Pedal (how Much is the Pedal Depressed?)

Values 0 to 100 [unit: %]

Remarks

In the brake pedal position sensor failure:

Transmitted failsafe value (0xFF)

Due to assembling error, this value might be beyond 100%.

3.3.3.19. Brake_Pedal_Intervention

This signal shows whether the brake pedal is depressed by a driver (intervention).

Values

TABLE 21

| Value | Description | Remarks |
|---|---|---|
| 0 | Not depressed | |
| 1 | depressed | |
| 2 | Beyond autonomy deceleration | |

When Brake_Pedal_Position is higher than the defined threshold value (BRK_INTV), this signal [Brake_Pedal_Intervention] will turn to "depressed".

When the requested deceleration from depressed brake pedal is higher than the requested deceleration from system (ADS, PCS etc.), this signal will turn to "Beyond autonomy deceleration".

Figure 16:
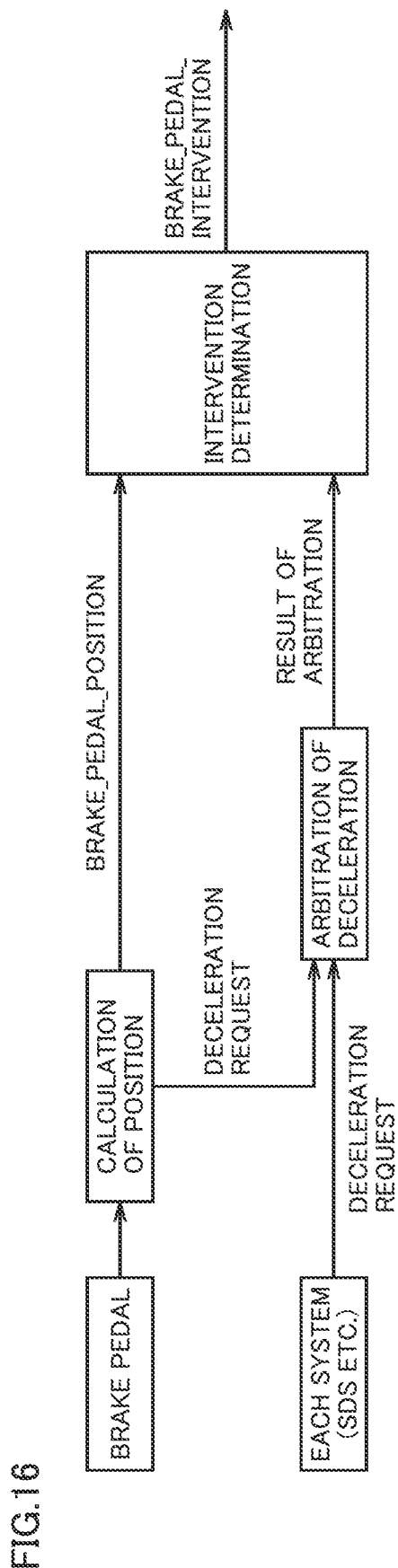
FIG. 16 is a diagram illustrating intervention by a brake pedal.

Detail Design (FIG. 16)

3.3.3.20. Steering_Wheel_Intervention

This signal shows whether the steering wheel is turned by a driver (intervention).

Values

TABLE 22

| Value | Description | Remarks |
|---|---|---|
| 0 | Not turned | |
| 1 | Turned collaboratively | Driver steering torque + steering motor torque |
| 2 | Turned by human driver | |

Remarks

In "Steering Wheel Intervention=1", considering the human driver's intent, EPS system will drive the steering with the Human driver collaboratively.

In "Steering Wheel Intervention=2", considering the human driver's intent, EPS system will reject the steering requirement from autonomous driving kit. (The steering will be driven the human driver.)

3.3.3.21. Shift_Lever_Intervention

This signal shows whether the shift lever is controlled by a driver (intervention).

Values

TABLE 23

| Value | Description | Remarks |
|---|---|---|
| 0 | OFF | |
| 1 | ON | Controlled (moved to any shift position) |

Remarks

N/A 3.3.3.22. WheelSpeed_FL, WheelSpeed_FR, WheelSpeed_RL, WheelSpeed_RR Wheel Speed Value Values

TABLE 24

| Value | Description | Remarks |
|---|---|---|
| others | Velocity [unit: m/s] | |
| Maximum Value | Invalid value | The sensor is invalid. |

Remarks

T.B.D.

3.3.3.23. WheelSpeed_FL_Rotation, WheelSpeed_FR_Rotation, WheelSpeed_RL_Rotation, WheelSpeed_RR_Rotation Rotation Direction of Each Wheel Values

TABLE 25

| value | Description | remarks |
|---|---|---|
| 0 | Forward | |
| 1 | Reverse | |
| 2 | Reserved | |
| 3 | Invalid value | The sensor is invalid. |

Remarks

After activation of ECU, until the rotation direction is fixed, "Forward" is set to this signal.

When detected continuously 2 (two) pulses with the same direction, the rotation direction will be fixed.

3.3.3.24. Actual_Moving_Direction

Rotation Direction of Wheel

Values

TABLE 26

| value | Description | remarks |
|---|---|---|
| 0 | Forward | |
| 1 | Reverse | |
| 2 | Standstill | |
| 3 | Undefined | |

Remarks

This signal shows "Standstill" when four wheel speed values are "0" during a constant time.

When other than above, this signal will be determined by the majority rule of four WheelSpeed_Rotations.

When more than two WheelSpeed_Rotations are "Reverse", this signal shows "Reverse".

When more than two WheelSpeed_Rotations are "Forward", this signal shows "Forward".

When "Forward" and "Reverse" are the same counts, this signal shows "Undefined".

3.3.3.25. Longitudinal_Velocity

Estimated Longitudinal Velocity of Vehicle

Values

TABLE 27

| Value | Description | Remarks |
|---|---|---|
| others | Velocity [unit: m/s] | |
| Maximum Value | Invalid value | The sensor is invalid. |

Remarks

This signal is output as the absolute value.

3.3.3.26. Longitudinal_Acceleration

Estimated Longitudinal Acceleration of Vehicle

Values

TABLE 28

| value | Description | Remarks |
|---|---|---|
| others | Acceleration [unit: m/s$^2$] | |
| Minimum Value | Invalid value | The sensor is invalid. |

Remarks

This signal will be calculated with wheel speed sensor and acceleration sensor.

When the vehicle is driven at a constant velocity on the flat road, this signal shows "0".

3.3.3.27. Lateral_Acceleration

Sensor Value of Lateral Acceleration of Vehicle

Values

TABLE 29

| Value | Description | Remarks |
|---|---|---|
| others | Acceleration [unit: m/s$^2$] | |
| Minimum Value | Invalid value | The sensor is invalid. |

Remarks

The positive value means counterclockwise. The negative value means clockwise.

3.3.3.28. Yawrate

Sensor Value of Yaw Rate

Values

TABLE 30

| Value | Description | Remarks |
|---|---|---|
| others | Yaw rate [unit: deg/s] | |
| Minimum Value | Invalid value | The sensor is invalid. |

Remarks

The positive value means counterclockwise. The negative value means clockwise.

3.3.3.29. Autonomy_State
State of Whether Autonomy Mode or Manual Mode
Values

TABLE 31

| value | Description | Remarks |
|---|---|---|
| 00 | Manual Mode | The mode starts from Manual mode. |
| 01 | Autonomous Mode | |

Remarks

The initial state is the Manual mode. (When Ready ON, the vehicle will start from the Manual mode.)

3.3.3.30. Autonomy_Ready
Situation of Whether the Vehicle can Transition to Autonomy Mode or not
Values

TABLE 32

| value | Description | Remarks |
|---|---|---|
| 00b | Not Ready For Autonomy | |
| 01b | Ready For Autonomy | |
| 11b | Invalid | means the status is not determined. |

Remarks

This signal is a part of transition conditions toward the Autonomy mode.

Please see the summary of conditions.

3.3.3.31. Autonomy_Fault
Status of whether the fault regarding a functionality in autonomy mode occurs or not
Values

TABLE 33

| value | Description | Remarks |
|---|---|---|
| 00b | No fault | |
| 01b | Fault | |
| 11b | Invalid | means the status is not determined. |

Remarks

[T.B.D.] Please see the other material regarding the fault codes of a functionality in autonomy mode.

[T.B.D.] Need to consider the condition to release the status of "fault".

3.4. APIs for BODY Control
3.4.1. Functions
T.B.D.
3.4.2. Inputs

TABLE 34

| Signal Name | Description | Redundancy |
|---|---|---|
| Turnsignallight_Mode_Command | Command to control the turnsignallight mode of the vehicle platform | N/A |
| Headlight_Mode_Command | Command to control the headlight mode of the vehicle platform | N/A |
| Hazardlight_Mode_Command | Command to control the hazardlight mode of the vehicle platform | N/A |
| Horn_Pattern_Command | Command to control the pattern of horn ON-time and OFF-time per cycle of the vehicle platform | N/A |
| Horn_Number_of_Cycle_Command | Command to control the Number of horn ON/OFF cycle of the vehicle platform | N/A |
| Horn_Continuous_Command | Command to control of horn ON of the vehicle platform | N/A |
| Windshieldwiper_Mode_Front_Command | Command to control the front windshield wiper of the vehicle platform | N/A |
| Windshieldwiper_Intermittent_Wiping_Speed_Command | Command to control the Windshield wiper actuation interval at the Intermittent mode | N/A |
| Windshieldwiper_Mode_Rear_Command | Command to control the rear windshield wiper mode of the vehicle platform | N/A |
| Hvac_1st_Command | Command to start/stop 1st row air conditioning control | N/A |
| Hvac_2nd_Command | Command to start/stop 2nd row air conditioning control | N/A |
| Hvac_TargetTemperature_1st_Left_Command | Command to set the target temperature around front left area | N/A |
| Hvac_TargetTemperature_1st_Right_Command | Command to set the target temperature around front right area | N/A |
| Hvac_TargetTemperature_2nd_Left_Command | Command to set the target temperature around rear left area | N/A |
| Hvac_TargetTemperature_2nd_Right_Command | Command to set the target temperature around rear right area | N/A |
| Hvac_Fan_Level_1st_Row_Command | Command to set the fan level on the front AC | N/A |
| Hvac_Fan_Level_2nd_Row_Command | Command to set the fan level on the rear AC | N/A |
| Hvac_1st_Row_AirOutlet_Mode_Command | Command to set the mode of 1st row air outlet | N/A |
| Hvac_2nd_Row_AirOutlet_Mode_Command | Command to set the mode of 2nd row air outlet | N/A |
| Hvac_Recirculate_Command | Command to set the air recirculation mode | N/A |
| Hvac_AC_Command | Command to set the AC mode | N/A |

3.4.2.1. Turnsignallight_Mode_Command

Command to Control the Turnsignallight Mode of the Vehicle Platform

Values

TABLE 35

| value | Description | remarks |
|---|---|---|
| 0 | OFF | Blinker OFF |
| 1 | Right | Right blinker ON |
| 2 | Left | Left blinker ON |
| 3 | reserved | |

Remarks

T.B.D.

Detailed Design

When Turnsignallight_Mode_Command=1, vehicle platform sends left blinker on request.

When Turnsignallight_Mode_Command=2, vehicle platform sends right blinker on request.

3.4.2.2. Headlight_Mode_Command

Command to Control the Headlight Mode of the Vehicle Platform

Values

TABLE 36

| Value | Description | remarks |
|---|---|---|
| 0 | No Request | Keep current mode |
| 1 | TAIL mode request | side lamp mode |
| 2 | HEAD mode request | Lo mode |
| 3 | AUTO mode request | |
| 4 | HI mode request | |
| 5 | OFF Mode Request | |
| 6-7 | reserved | |

Remarks

This command is valid when Headlight_Driver_Input=OFF or Auto mode ON.

Driver input overrides this command.

Headlight mode changes when Vehicle platform receives once this command.

3.4.2.3. Hazardlight_Mode_Command

Command to Control the Hazardlight Mode of the Vehicle Platform

Values

TABLE 37

| value | Description | remarks |
|---|---|---|
| 0 | OFF | command for hazardlight OFF |
| 1 | ON | command for hazardlight ON |

Remarks

Driver input overrides this command.

Hazardlight is active during Vehicle Platform receives ON command.

3.4.2.4. Horn_Pattern_Command

Command to Control the Pattern of Horn ON-Time and OFF-Time Per Cycle of the Vehicle Platform Values

TABLE 38

| value | Description | remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | reserved |
| 4 | Pattern 4 | reserved |
| 5 | Pattern 5 | reserved |
| 6 | Pattern 6 | reserved |
| 7 | Pattern 7 | Reserved |

Remarks

Pattern 1 is assumed to use single short ON, Pattern 2 is assumed to use ON-OFF repeating.

Detail is under internal discussion.

3.4.2.5. Horn_Number_of_Cycle_Command

Command to Control the Number of Horn ON/OFF Cycle of the Vehicle Platform

Values

0~7 [–]

Remarks

Detail is under internal discussion.

3.4.2.6. Horn_Continuous_Command

Command to Control of Horn ON of the Vehicle Platform

Values

TABLE 39

| value | Description | remarks |
|---|---|---|
| 0 | No request | |
| 1 | ON request | |

Remarks

This command overrides Horn_Pattern_Command, Horn_Number_of_Cycle_Command.

Horn is active during Vehicle Platform receives ON command.

Detail is under internal discussion.

3.4.2.7. Windshieldwiper_Mode_Front_Command

Command to control the front windshield wiper of the vehicle platform

Values

TABLE 40

| value | Description | remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-Time Wiping |
| 6, 7 | Reserved | |

Remarks

This command is under internal discussion the timing of valid.

This command is valid when Windshieldwiper_Front_Driver_Input=OFF or Auto mode ON.

Driver input overrides this command.

Windshieldwiper mode is kept during Vehicle platform is receiving the command.

3.4.2.8. Windshieldwiper_Intermittent_Wiping_Speed_Command

Command to Control the Windshield Wiper Actuation Interval at the Intermittent Mode Values

TABLE 41

| value | Description | remarks |
|---|---|---|
| 0 | FAST | |
| 1 | SECOND FAST | |
| 2 | THIRD FAST | |
| 3 | SLOW | |

Remarks
- This command is valid when Windshieldwiper_Mode_Front_Status=INT.
- Driver input overrides this command.
- Windshieldwiper intermittent mode changes when Vehicle platform receives once this command.

3.4.2.9. Windshieldwiper_Mode_Rear_Command

Command to Control the Rear Windshield Wiper Mode of the Vehicle Platform

Values

TABLE 42

| value | Description | Remarks |
|---|---|---|
| 0 | OFF mode request | |
| 1 | Lo mode request | |
| 2 | reserved | |
| 3 | Intermittent mode request | |
| 4-7 | reserved | |

Remarks
- Driver input overrides this command.
- Windshieldwiper mode is kept during Vehicle platform is receiving the command.
- Wiping speed of intermittent mode is not variable.

3.4.2.10. Hvac_1st_Command

Command to Start/Stop 1st Row Air Conditioning Control

Values

TABLE 43

| value | Description | Remarks |
|---|---|---|
| 00 | No request | |
| 01 | ON | means turning the 1st air conditioning control to ON |
| 02 | OFF | means turning the 1st air conditioning control to OFF |

Remarks

The hvac of S-AM has a synchronization functionality. Therefore, in order to control 4 (four) hvacs (1st_left/right, 2nd_left/right) individually, VCIB achieves the following procedure after Ready-ON. (This functionality will be implemented from the CV.)
- #1: Hvac_1st_Command=ON
- #2: Hvac_2nd_Command=ON
- #3: Hvac_TargetTemperature_2nd_Left_Command
- #4: Hvac_TargetTemperature_2nd_Right_Command
- #5: Hvac_Fan_Level_2nd_Row_Command
- #6: Hvac_2nd_Row_AirOutlet_Mode_Command
- #7: Hvac_TargetTemperature_1st_Left_Command
- #8: Hvac_TargetTemperature_1st_Right_Command
- #9: Hvac_Fan_Level_1st_Row_Command
- #10: Hvac_1st_Row_AirOutlet_Mode_Command The interval between each command needs 200 ms or more.

Other commands are able to be executed after #1.

3.4.2.11. Hvac_2nd_Command

Command to Start/Stop 2nd Row Air Conditioning Control

Values

TABLE 44

| value | Description | Remarks |
|---|---|---|
| 00 | No request | |
| 01 | ON | means turning the 2nd air conditioning control to ON |
| 02 | OFF | means turning the 2nd air conditioning control to OFF |

Remarks

N/A 3.4.2.12. Hvac_TargetTemperature_1st_Left_Command

Command to Set the Target Temperature Around Front Left Area

Values

TABLE 45

| value | Description | Remarks |
|---|---|---|
| 0 | No request | |
| 60 to 85 [unit: ° F.] (by 1.0° F.) | Temperature direction | |

Remarks

N/A 3.4.2.13. Hvac_TargetTemperature_1st_Right_Command

Command to Set the Target Temperature Around Front Right Area

Values

TABLE 46

| value | Description | Remarks |
|---|---|---|
| 0 | No request | |
| 60 to 85 [unit: ° F.] (by 1.0° F.) | Temperature direction | |

Remarks

N/A 3.4.2.14. Hvac_TargetTemperature_2nd_Left_Command

Command to Set the Target Temperature Around Rear Left Area

Values

TABLE 47

| value | Description | Remarks |
|---|---|---|
| 0 | No request | |
| 60 to 85 [unit: ° F.] (by 1.0° F.) | Temperature direction | |

Remarks

N/A 3.4.2.15. Hvac_TargetTemperature_2nd_Right_Command

Command to Set the Target Temperature Around Rear Right Area

Values

TABLE 48

| value | Description | Remarks |
|---|---|---|
| 0 | No request | |
| 60 to 85 [unit: ° F.] (by 1.0° F.) | Temperature direction | |

Remarks

N/A 3.4.2.16. Hvac_Fan_Level_1st_Row_Command

Command to Set the Fan Level on the Front AC

Values

TABLE 49

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_1st_Command=OFF".

If you would like to turn the fan level to AUTO, you should transmit

"Hvac_1st_Command=ON".

3.4.2.17. Hvac_Fan_Level_2nd_Row_Command

Command to Set the Fan Level on the Rear AC

Values

TABLE 50

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_2nd_Command=OFF".

If you would like to turn the fan level to AUTO, you should transmit "Hvac_2nd_Command=ON".

3.4.2.18. Hvac_1st_Row_AirOutlet_Mode_Command

Command to Set the Mode of 1st Row Air Outlet

Values

TABLE 51

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |

Remarks

N/A 3.4.2.19. Hvac_2nd_Row_AirOutlet_Mode_Command Command to Set the Mode of 2nd Row Air Outlet Values

TABLE 52

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |

Remarks

N/A 3.4.2.20. Hvac_Recirculate_Command

Command to Set the Air Recirculation Mode

Values

TABLE 53

| value | Description | Remarks |
|---|---|---|
| 00 | No request | |
| 01 | ON | means turning the air recirculation mode ON |
| 02 | OFF | means turning the air recirculation mode OFF |

Remarks

N/A 3.4.2.21. Hvac_AC_Command

Command to Set the AC Mode

Values

TABLE 54

| value | Description | remarks |
|---|---|---|
| 00 | No request | |
| 01 | ON | means turning the AC mode ON |
| 02 | OFF | means turning the AC mode OFF |

Remarks

N/A 3.4.3. Outputs

TABLE 55

| Signal Name | Description | Redundancy |
|---|---|---|
| Turnsignallight_Mode_Status | Status of the current turnsignallight mode of the vehicle platform | N/A |
| Headlight_Mode_Status | Status of the current headlight mode of the vehicle platform | N/A |
| Hazardlight_Mode_Status | Status of the current hazardlight mode of the vehicle platform | N/A |

TABLE 55-continued

| Signal Name | Description | Redundancy |
|---|---|---|
| Horn_Status | Status of the current horn of the vehicle platform | N/A |
| Windshieldwiper_Mode_Front_Status | Status of the current front windshield wiper mode of the vehicle platform | N/A |
| Windshieldwiper_Mode_Rear_Status | Status of the current rear windshield wiper mode of the vehicle platform | N/A |
| Hvac_$1^{st}$_Status | Status of activation of the $1^{st}$ row HVAC | N/A |
| Hvac_$2^{nd}$_Status | Status of activation of the $2^{nd}$ row HVAC | N/A |
| Hvac_Temperature_$1^{st}$_Left_Status | Status of set temperature of $1^{st}$ row left | N/A |
| Hvac_Temperature_$1^{st}$_Right_Status | Status of set temperature of $1^{st}$ row right | N/A |
| Hvac_Temperature_$2^{nd}$_Left_Status | Status of set temperature of $2^{nd}$ row left | N/A |
| Hvac_Temperature_$2^{nd}$_Right_Status | Status of set temperature of $2^{nd}$ row right | N/A |
| Hvac_Fan_Level_$1^{st}$_Row_Status | Status of set fan level of $1^{st}$ row | N/A |
| Hvac_Fan_Level_$2^{nd}$_Row_Status | Status of set fan level of $2^{nd}$ row | N/A |
| Hvac_1st_Row_AirOutlet_Mode_Status | Status of mode of 1st row air outlet | N/A |
| Hvac_2nd_Row_AirOutlet_Mode_Status | Status of mode of 2nd row air outlet | N/A |
| Hvac_Recirculate_Status | Status of set air recirculation mode | N/A |
| Hvac_AC_Status | Status of set AC mode | N/A |
| 1st_Right_Seat_Occupancy_Status | Seat occupancy status in 1st left seat | — |
| 1st_Left_Seat_Belt_Status | Status of driver's seat belt buckle switch | — |
| 1st_Right_Seat_Belt_Status | Status of passenger's seat belt buckle switch | — |
| 2nd_Left_Seat_Belt_Status | Seat belt buckle switch status in 2nd left seat | — |
| 2nd_Right_Seat_Belt_Status | Seat belt buckle switch status in 2nd right seat | — |

3.4.3.1. Turnsignallight_Mode_Status
Status of the Current Turnsignallight Mode of the Vehicle Platform
Values

TABLE 56

| value | Description | Remarks |
|---|---|---|
| 0 | OFF | Turn lamp = OFF |
| 1 | Left | Turn lamp L = ON (flashing) |
| 2 | Right | Turn lamp R = ON (flashing) |
| 3 | invalid | |

Remarks
At the time of the disconnection detection of the turn lamp, state is ON.
At the time of the short detection of the turn lamp, State is OFF.
3.4.3.2. Headlight_Mode_Status
Status of the Current Headlight Mode of the Vehicle Platform
Values

TABLE 57

| Value | Description | Remarks |
|---|---|---|
| 0 | OFF | |
| 1 | TAIL | |
| 2 | Lo | |
| 3 | reserved | |
| 4 | Hi | |
| 5-6 | reserved | |
| 7 | invalid | |

Remarks
N/A
Detailed Design
At the time of tail signal ON, Vehicle Platform sends 1.
At the time of Lo signal ON, Vehicle Platform sends 2.
At the time of Hi signal ON, Vehicle Platform sends 4.
At the time of any signal above OFF, Vehicle Platform sends 0.
3.4.3.3. Hazardlight_Mode_Status
Status of the Current Hazard Lamp Mode of the Vehicle Platform
Values

TABLE 58

| Value | Description | Remarks |
|---|---|---|
| 0 | OFF | Hazard lamp = OFF |
| 1 | Hazard | Hazard lamp = ON (flashing) |
| 2 | reserved | |
| 3 | invalid | |

Remarks
N/A
3.4.3.4. Horn_Status
Status of the Current Horn of the Vehicle Platform
Values

TABLE 59

| Value | Description | Remarks |
|---|---|---|
| 0 | OFF | |
| 1 | ON | |

TABLE 59-continued

| Value | Description | Remarks |
|---|---|---|
| 2 | reserved (unsupport) | |
| 3 | invalid (unsupport) | |

Remarks
cannot detect any failure.
Vehicle platform sends "1" during Horn Pattern Command is active, if the horn is OFF.

3.4.3.5. Windshieldwiper_Mode_Front_Status
Status of the Current Front Windshield Wiper Mode of the Vehicle Platform
Values

TABLE 60

| Value | Description | Remarks |
|---|---|---|
| 0 | OFF | Front wiper stopped |
| 1 | Lo | Front wiper being active in LO mode (also including being active in MIST, being active in coordination with washer, and being wiping at speed other than HI) |
| 2 | Hi | Front wiper being active in HI mode |
| 3 | INT | Front wiper being active in INT mode (also including motor stop while being active in INT mode and being active in INT mode owing to vehicle speed change function) |
| 4-5 | reserved | |
| 6 | fail | Front wiper failed |
| 7 | invalid | |

TABLE 61

| Value | Description | Remarks |
|---|---|---|
| 0 | OFF | Front wiper is stopped. |
| 1 | Lo | Front wiper is in LO mode (include in MIST mode, operation with washer, Medium speed). |
| 2 | Hi | Front wiper is in HI mode. |
| 3 | INT | Front wiper is in INT mode (include motor stopped between INT mode, INT operation of vehicle speed change function). |
| 4-5 | reserved | |
| 6 | fail | Front wiper is fail. |
| 7 | invalid | |

Remarks
Fail Mode Conditions
detect signal discontinuity
cannot detect except the above failure.

3.4.3.6. Windshieldwiper_Mode_Rear_Status
Status of the Current Rear Windshield Wiper Mode of the Vehicle Platform
Values

TABLE 62

| Value | Description | Remarks |
|---|---|---|
| 0 | OFF | Rear wiper stopped |
| 1 | Lo | Rear wiper being in LO mode |
| 2 | reserved | |
| 3 | INT | Rear wiper being in INT mode |
| 4-5 | reserved | |
| 6 | fail | Rear wiper failed |
| 7 | invalid | |

Remarks
cannot detect any failure.

3.4.3.7. Hvac_1st_Status
Status of Activation of the 1st Row HVAC
Values

TABLE 63

| value | Description | remarks |
|---|---|---|
| 0b | OFF | |
| 1b | ON | |

Remarks
N/A 3.4.3.8. Hvac_2nd_Status
Status of Activation of the 2nd Row HVAC
Values

TABLE 64

| value | Description | remarks |
|---|---|---|
| 0b | OFF | |
| 1b | ON | |

Remarks
N/A 3.4.3.9. Hvac_Temperature_1st_Left_Status
Status of Set Temperature of 1st Row Left
Values

TABLE 65

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A 3.4.3.10. Hvac_Temperature_1st_Right_Status
Status of Set Temperature of 1st Row Right
Values

TABLE 66

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A 3.4.3.11. Hvac_Temperature_2nd_Left_Status
Status of Set Temperature of 2nd Row Left
Values

TABLE 67

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A 3.4.3.12. Hvac_Temperature_2nd_Right_Status
Status of Set Temperature of 2nd Row Right
Values

TABLE 68

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A 3.4.3.13. Hvac_Fan_Level_1st_Row_Status
Status of Set Fan Level of 1st Row
Values

TABLE 69

| value | Description | remarks |
|---|---|---|
| 0 | OFF | |
| 1-7 | Fan Level | |
| 8 | Undefined | |

Remarks
N/A 3.4.3.14. Hvac_Fan_Level_2nd_Row_Status
Status of Set Fan Level of 2nd Row
Values

TABLE 70

| value | Description | remarks |
|---|---|---|
| 0 | OFF | |
| 1-7 | Fan Level | |
| 8 | Undefined | |

Remarks
N/A 3.4.3.15. Hvac_1st_Row_AirOutlet_Mode_Status
Status of Mode of 1st Row Air Outlet
Values

TABLE 71

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |
| 101b | DEF | The windshield defogger operates |
| 111b | Undefined | |

Remarks
N/A 3.4.3.16. Hvac_2nd_Row_AirOutlet_Mode_Status
Status of Mode of 2nd Row Air Outlet
Values

TABLE 72

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 111b | Undefined | |

Remarks
N/A 3.4.3.17. Hvac_Recirculate_Status
Status of Set Air Recirculation Mode
Values

TABLE 73

| value | Description | remarks |
|---|---|---|
| 00 | OFF | means that the air recirculation mode is OFF |
| 01 | ON | means that the air recirculation mode is ON |

Remarks
N/A 3.4.3.18. Hvac_AC_Status
Status of Set AC Mode
Values

TABLE 74

| value | Description | remarks |
|---|---|---|
| 00 | OFF | means that the AC mode is OFF |
| 01 | ON | means that the AC mode is ON |

Remarks N/A 3.4.3.19. 1st_Right_Seat_Occupancy_Status
Seat Occupancy Status in 1st Left Seat
Values

TABLE 75

| value | Description | remarks |
|---|---|---|
| 0 | Not occupied | |
| 1 | Occupied | |
| 2 | Undecided | IG OFF or signal from sensor being lost |
| 3 | Failed | |

Remarks
When there is luggage on the seat, this signal may be set to "Occupied".

3.4.3.20. 1st_Left_Seat_Belt_Status
Status of Driver's Seat Belt Buckle Switch
Values

TABLE 76

| value | Description | remarks |
|---|---|---|
| 0 | Buckled | |
| 1 | Unbuckled | |
| 2 | Undetermined | |
| 3 | Fault of a switch | |

Remarks
  When Driver's seat belt buckle switch status signal is not set, [undetermined] is transmitted.
  It is checking to a person in charge, when using it. (Outputs "undetermined=10" as an initial value.)
  The judgement result of buckling/unbuckling shall be transferred to CAN transmission buffer within 1.3s after IG_ON or before allowing firing, whichever is earlier.

3.4.3.21. 1st_Right_Seat_Belt_Status

Status of Passenger's Seat Belt Buckle Switch

Values

TABLE 77

| value | Description | remarks |
|---|---|---|
| 0 | Buckled | |
| 1 | Unbuckled | |
| 2 | Undetermined | |
| 3 | Fault of a switch | |

Remarks
  When Passenger's seat belt buckle switch status signal is not set, [undetermined] is transmitted.
  It is checking to a person in charge, when using it. (Outputs "undetermined=10" as an initial value.)
  The judgement result of buckling/unbuckling shall be transferred to CAN transmission buffer within 1.3s after IG_ON or before allowing firing, whichever is earlier.

3.4.3.22. 2nd_Left_Seat_Belt_Status

Seat Belt Buckle Switch Status in 2nd Left Seat

Values

TABLE 78

| value | Description | remarks |
|---|---|---|
| 0 | Buckled | |
| 1 | Unbuckled | |
| 2 | Undetermined | |
| 3 | Reserved | |

Remarks
  cannot detect sensor failure.

3.4.3.23. 2nd_Right_Seat_Belt_Status

Seat Belt Buckle Switch Status in 2nd Right Seat

Values

TABLE 79

| value | Description | remarks |
|---|---|---|
| 0 | Buckled | |
| 1 | Unbuckled | |
| 2 | Undetermined | |
| 3 | Reserved | |

Remarks
  cannot detect any failure.

3.5. APIs for Power control 3.5.1. Functions

T.B.D.

3.5.2. Inputs

TABLE 80

| Signal Name | Description | Redundancy |
|---|---|---|
| Power_Mode_Request | Command to control the power mode of the vehicle platform | N/A |

3.5.2.1. Power_Mode_Request

Command to Control the Power Mode of the Vehicle Platform

Values

TABLE 81

| Value | Description | Remarks |
|---|---|---|
| 00 | No request | |
| 01 | Sleep | means "Ready OFF" |
| 02 | Wake | means that VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |

Remarks
  Regarding "wake", let us share how to achieve this signal on the CAN. (See the other material) Basically, it is based on "ISO11989-2:2016". Also, this signal should not be a simple value. Anyway, please see the other material.
  This API will reject the next request for a certain time [4000 ms] after receiving a request.
  The followings are the explanation of the three power modes, i.e. [Sleep] [Wake] [Driving Mode], which are controllable via API.
  [Sleep]
    Vehicle power off condition. In this mode, the high voltage battery does not supply power, and neither VCIB nor other VP ECUs are activated.
  [Wake]
    VCIB is awake by the low voltage battery. In this mode, ECUs other than VCIB are not awake except for some of the body electrical ECUs.
  [Driving Mode]
    Ready ON mode. In this mode, the high voltage battery supplies power to the whole VP and all the VP ECUs including VCIB are awake.

3.5.3. Outputs

TABLE 82

| Signal Name | Description | Redundancy |
|---|---|---|
| Power_Mode_Status | Status of the current power mode of the vehicle platform | N/A |

3.5.3.1. Power_Mode_Status

Status of the Current Power Mode of the Vehicle Platform

Values

TABLE 83

| Value | Description | Remarks |
|---|---|---|
| 00 | Resd | Reserved for same data align as mode request |
| 01 | Sleep | means "Ready OFF" |
| 02 | Wake | means that the only VCIB turns ON |
| 03 | Resd | Reserved for data expansion |
| 04 | Resd | Reserved for data expansion |
| 05 | Resd | Reserved for data expansion |

TABLE 83-continued

| Value | Description | Remarks |
|---|---|---|
| 06 | Driving Mode | means "Ready ON" |
| 07 | unknown | means unhealthy situation would occur |

Remarks
  VCIB will transmit [Sleep] as Power_Mode_Status continuously for 3000 [ms] after executing the sleep sequence. And then, VCIB will be shutdown.
3.6. APIs for Safety
3.6.1. Functions
  T.B.D.
3.6.2. Inputs

TABLE 84

| Signal Name | Description | Redundancy |
|---|---|---|
| T.B.D. | | |

3.6.3. Outputs

TABLE 85

| Signal Name | Description | Redundancy |
|---|---|---|
| Request for Operation | Request for operation according to status of vehicle platform toward ADS | |
| Passive_Safety_Functions_Triggered | Collision detection signal | — |
| Brake_System_Degradation_Modes | Indicates Brake_System_Degradation_Modes | Applied |
| Propulsive_System_Degradation_Modes | Indicates Propulsive_System_Degradation_Modes | N/A |
| Direction_Control_Degradation_Modes | Indicates Direction_Control_Degradation_Modes | N/A |
| WheelLock_Control_Degradation_Modes | Indicates WheelLock_Control_Degradation_Modes | Applied |
| Steering_System_Degradation_Modes | Indicates Steering_System_Degradation_Modes | Applied |
| Power_System_Degradation_Modes | Indicates Power_System_Degradation_Modes | Applied |
| Communication_Degradation_Modes | | |

3.6.3.1. Request for Operation
  Request for Operation According to Status of Vehicle Platform Toward ADS
  Values

TABLE 86

| value | Description | remarks |
|---|---|---|
| 0 | No request | |
| 1 | Need maintenance | |
| 2 | Need back to garage | |
| 3 | Need stopping safely immediately | |
| Others | Reserved | |

Remarks
  T.B.D.
3.6.3.2. Passive_Safety_Functions_Triggered
Crash Detection Signal
  Values

TABLE 87

| value | Description | remarks |
|---|---|---|
| 0 | Normal | |
| 5 | Crash Detection (airbag) | |

TABLE 87-continued

| value | Description | remarks |
|---|---|---|
| 6 | Crash Detection (high voltage circuit is shut off) | |
| 7 | Invalid Value | |
| Others | Reserved | |

Remarks
  When the event of crash detection is generated, the signal is transmitted 50 consecutive times every 100 [ms]. If the crash detection state changes before the signal transmission is completed, the high signal of priority is transmitted.
  Priority: crash detection>normal
  Transmits for 5s regardless of ordinary response at crash, because the vehicle breakdown judgment system shall send a voltage OFF request for 5 s or less after crash in HV vehicle.
  Transmission interval is 100 ms within fuel cutoff motion delay allowance time (1 s) so that data can be transmitted more than 5 times. In this case, an instantaneous power interruption is taken into account.
  3.6.3.3. Brake_System_Degradation_Modes
  Indicate Brake_System Status
  Values

TABLE 88

| value | Description | remarks |
|---|---|---|
| 0 | Normal | — |
| 1 | Failure detected | — |

Remarks
  When the Failure is detected, Safe stop is moved.
  3.6.3.4. Propulsive_System_Degradation_Modes
  Indicate Powertrain_System Status
  Values

TABLE 89

| value | Description | remarks |
|---|---|---|
| 0 | Normal | — |
| 1 | Failure detected | — |

Remarks
    When the Failure is detected, Safe stop is moved.
    3.6.3.5. Direction_Control_Degradation_Modes
    Indicate Direction Control status
Values

TABLE 90

| value | Description | remarks |
|---|---|---|
| 0 | Normal | — |
| 1 | Failure detected | — |

Remarks
    When the Failure is detected, Safe stop is moved.
    When the Failure is detected, Propulsion Direction Command is refused.
    3.6.3.6. WheelLock_Control_Degradation_Modes
    Indicate WheelLock_Control status
Values

TABLE 91

| value | Description | remarks |
|---|---|---|
| 0 | Normal | — |
| 1 | Failure detected | — |

Remarks
    Primary indicates EPB status, and Secondary indicates SBW indicates.
    When the Failure is detected, Safe stop is moved.
    3.6.3.7. Steering_System_Degradation_Modes
    Indicate Steering_System Status
Values

TABLE 92

| value | Description | remarks |
|---|---|---|
| 0 | Normal | — |
| 1 | Failure detected | — |
| 2 | Stationary steering not possible | Temporary lowering in performance due to high temperature or the like |

When the Failure are detected, Safe stop is moved.
3.6.3.8. Power_System_Degradation_Modes
[T.B.D]
3.6.3.9. Communication_Degradation_Modes
[T.B.D]
3.7. APIs for Security
3.7.1. Functions
    T.B.D.
3.7.2. Inputs

TABLE 93

| Signal Name | Description | Redundancy |
|---|---|---|
| 1st_Left_Door_Lock_Command | Command to control each door lock of the vehicle platform Lock command supports only ALL Door Lock. Unlock command supports 1st-left Door unlock only, and ALL Door unlock. Trunk Door Lock/unlock command include in ALL Door lock/unlock | N/A |
| 1st_Right_Door_Lock_Command | | N/A |
| 2nd_Left_Door_Lock_Command | | N/A |
| 2nd_Right_Door_Lock_Command | | N/A |
| Central_Vehicle_Lock_Exterior_Command | Command to control the all door lock of the vehicle platform | N/A |

3.7.2.1. 1st_Left_Door_Lock_Command, 1st_Right_Door_Lock_Command, 2nd_Left_Door_Lock_Command, 2nd_Right_Door_Lock_Command Command to control each door lock of the vehicle platform
Values

TABLE 94

| Value | Description | Remarks |
|---|---|---|
| 0 | No Request | |
| 1 | Lock (unsupported) | |
| 2 | Unlock | |
| 3 | reserved | |

Remarks
    Lock command supports only ALL Door Lock.
    Unlock command supports 1st-left Door unlock only, and ALL Door unlock.
    3.7.2.2. Central_Vehicle_Lock_Exterior_Command
    Command to control the all door lock of the vehicle platform.
Values

TABLE 95

| Value | Description | Remarks |
|---|---|---|
| 0 | No Request | |
| 1 | Lock (all) | include trunk lock |
| 2 | Unlock (all) | include trunk unlock |
| 3 | reserved | |

Remarks
    Lock command supports only ALL Door Lock.
    Unlock command supports 1st-left Door unlock only, and ALL Door unlock.

3.7.3. Outputs

TABLE 96

| Signal Name | Description | Redundancy |
| --- | --- | --- |
| 1st_Left_Door_Lock_Status | Status of the current 1st-left door lock mode of the vehicle platform | N/A |
| 1st_Right_Door_Lock_Status | Status of the current 1st-right door lock mode of the vehicle platform | N/A |
| 2nd_Left_Door_Lock_Status | Status of the current 2nd-left door lock mode of the vehicle platform | N/A |
| 2nd_Right_Door_Lock_Status | Status of the current 2nd-right door lock mode of the vehicle platform | N/A |
| Central_Vehicle_Exterior_Locked_Status | Status of the current all door lock mode of the vehicle platform | N/A |
| Vehicle_Alarm_Status | Status of the current vehicle alarm of the vehicle platform | N/A |

3.7.3.1. 1st_Left_Door_Lock_Status

Status of the Current 1st-Left Door Lock Mode of the Vehicle Platform

Values

TABLE 97

| value | Description | Remarks |
| --- | --- | --- |
| 0 | reserved | |
| 1 | Locked | D seat locked |
| 2 | Unlocked | D seat unlocked |
| 3 | invalid | |

Remarks cannot detect any failure.

3.7.3.2. 1st_Right_Door_Lock_Status

Status of the Current 1st-Right Door Lock Mode of the Vehicle Platform

Values

TABLE 98

| value | Description | remarks |
| --- | --- | --- |
| 0 | reserved | |
| 1 | Locked | P seat locked |
| 2 | Unlocked | P seat unlocked |
| 3 | invalid | |

Remarks cannot detect any failure.

3.7.3.3. 2nd_Left_Door_Lock_Status

Status of the Current 2nd-Left Door Lock Mode of the Vehicle Platform

Values

TABLE 99

| Value | Description | remarks |
| --- | --- | --- |
| 0 | Reserved | |
| 1 | Locked | RL seat locked |
| 2 | Unlocked | RL seat unlocked |
| 3 | invalid | |

Remarks cannot detect any failure.

3.7.3.4. 2nd_Right_Door_Lock_Status

Status of the Current 2nd-Right Door Lock Mode of the Vehicle Platform Values

TABLE 100

| value | Description | remarks |
| --- | --- | --- |
| 0 | reserved | |
| 1 | Locked | RR seat locked |
| 2 | Unlocked | RR seat unlocked |
| 3 | invalid | |

Remarks cannot detect any failure.

3.7.3.5. Central_Vehicle_Exterior_Locked_Status

Status of the Current all Door Lock Mode of the Vehicle Platform

Values

TABLE 101

| value | Description | remarks |
| --- | --- | --- |
| 0 | Reserved (unsupport) | |
| 1 | All Locked (unsupport) | |
| 2 | Anything Unlocked (unsupport) | |
| 3 | invalid (unsupport) | |

Remarks

Vehicle platform refers to each door lock status, in case any door unlocked, sends 0.

in case all door locked, sends 1.

3.7.3.6. Vehicle_Alarm_Status

Status of the Current Vehicle Alarm of the Vehicle Platform

Values

TABLE 102

| Value | Description | remarks |
| --- | --- | --- |
| 0 | Disarmed | Auto alarm system not active |
| 1 | Armed | Auto alarm system active • not on alert |
| 2 | Active | Auto alarm system active • on alert |
| 3 | invalid | |

Remarks

N/A

3.8. APIs for MaaS Service

3.8.1. Functions

T.B.D.

3.8.2. Inputs

TABLE 104

| Signal Name | Description | Redundancy |
|---|---|---|
| T.B.D. | | |

3.8.3. Outputs

TABLE 103

| Signal Name | Description | Redundancy |
|---|---|---|
| T.B.D. | | |

Example 2

Toyota's MaaS Vehicle Platform
Architecture Specification
[Standard Edition #0.1]
History of Revision

TABLE 105

| Date of Revision | ver. | Summary of Revision | Reviser |
|---|---|---|---|
| 2019 Nov. 4 | 0.1 | Creating a new material | MaaS Business Div. |

Index
  1. General Concept 4
    1.1. Purpose of this Specification 4
    1.2. Target Vehicle Type 4
    1.3. Target Electronic Platform 4
    1.4. Definition of Term 4
    1.5. Precaution for Handling 4
    1.6. Overall Structure of MaaS 4
    1.7. Adopted Development Process 6
    1.8. ODD (Operational Design Domain) 6
  2. Safety Concept 7
    2.1. Outline 7
    2.2. Hazard analysis and risk assessment 7
    2.3. Allocation of safety requirements 8
    2.4. Redundancy 8
  3. Security Concept 10
    3.1. Outline 10
    3.2. Assumed Risks 10
    3.3. Countermeasure for the risks 10
      3.3.1. The countermeasure for a remote attack 11
      3.3.2. The countermeasure for a modification 11
    3.4. Addressing Held Data Information 11
    3.5. Addressing Vulnerability 11
    3.6. Contract with Operation Entity 11
  4. System Architecture 12
    4.1. Outline 12
    4.2. Physical LAN architecture (in-Vehicle) 12
    4.3. Power Supply Structure 14
  5. Function Allocation 15
    5.1. in a healthy situation 15
    5.2. in a single failure 16
  6. Data Collection 18
    6.1. At event 18
    6.2. Constantly 18

1. General Concept
  1.1. Purpose of this Specification
  This document is an architecture specification of Toyota's MaaS Vehicle Platform and contains the outline of system in vehicle level.
  1.2. Target Vehicle Type
  This specification is applied to the Toyota vehicles with the electronic platform called 19ePF [ver.1 and ver.2].
  The representative vehicle with 19ePF is shown as follows.
  e-Palette, Sienna, RAV4, and so on.
  1.3. Definition of Term

TABLE 106

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

Figure 17:
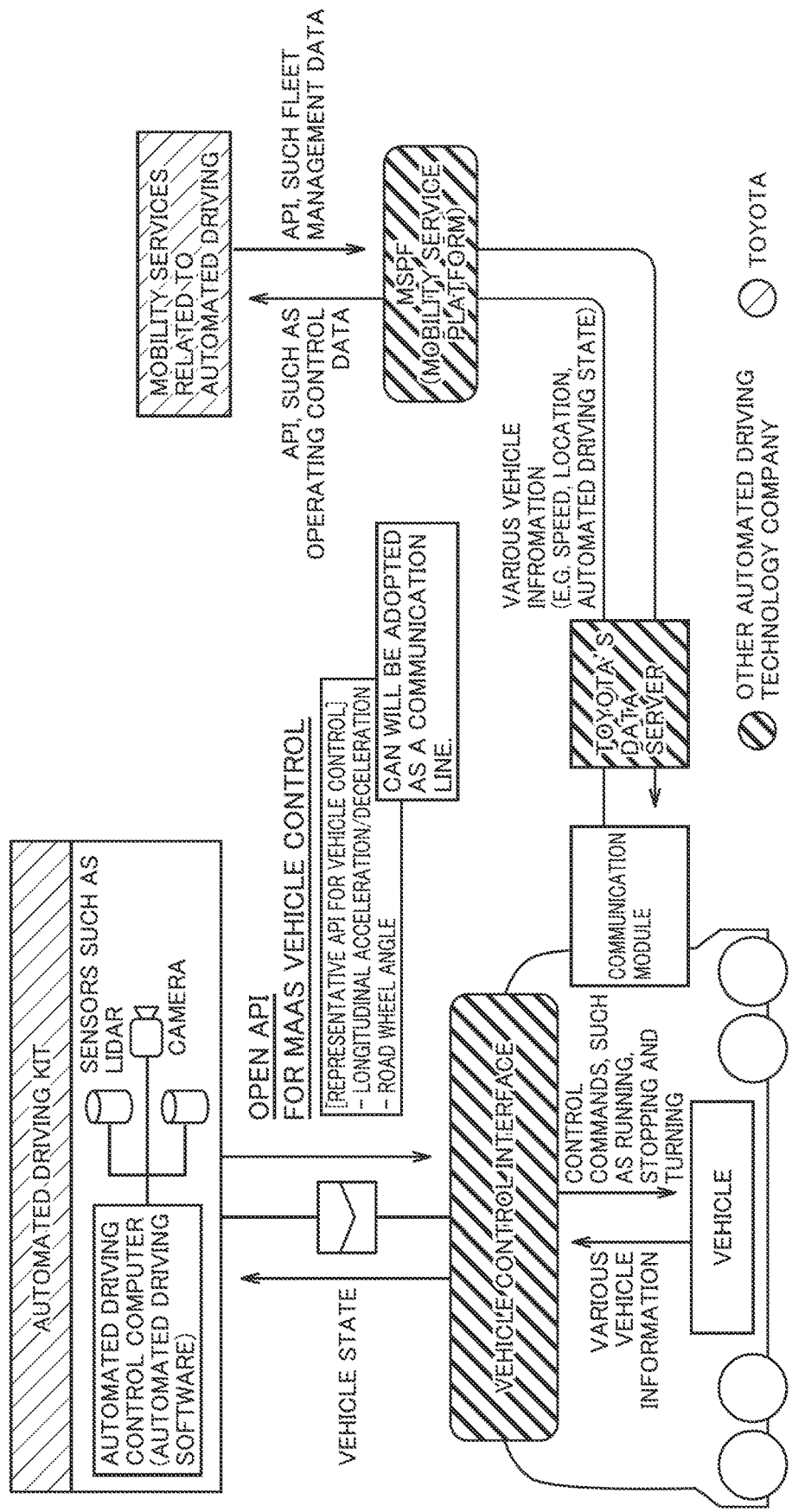
FIG. 17 is a diagram of an overall configuration of MaaS.
Figure 18:
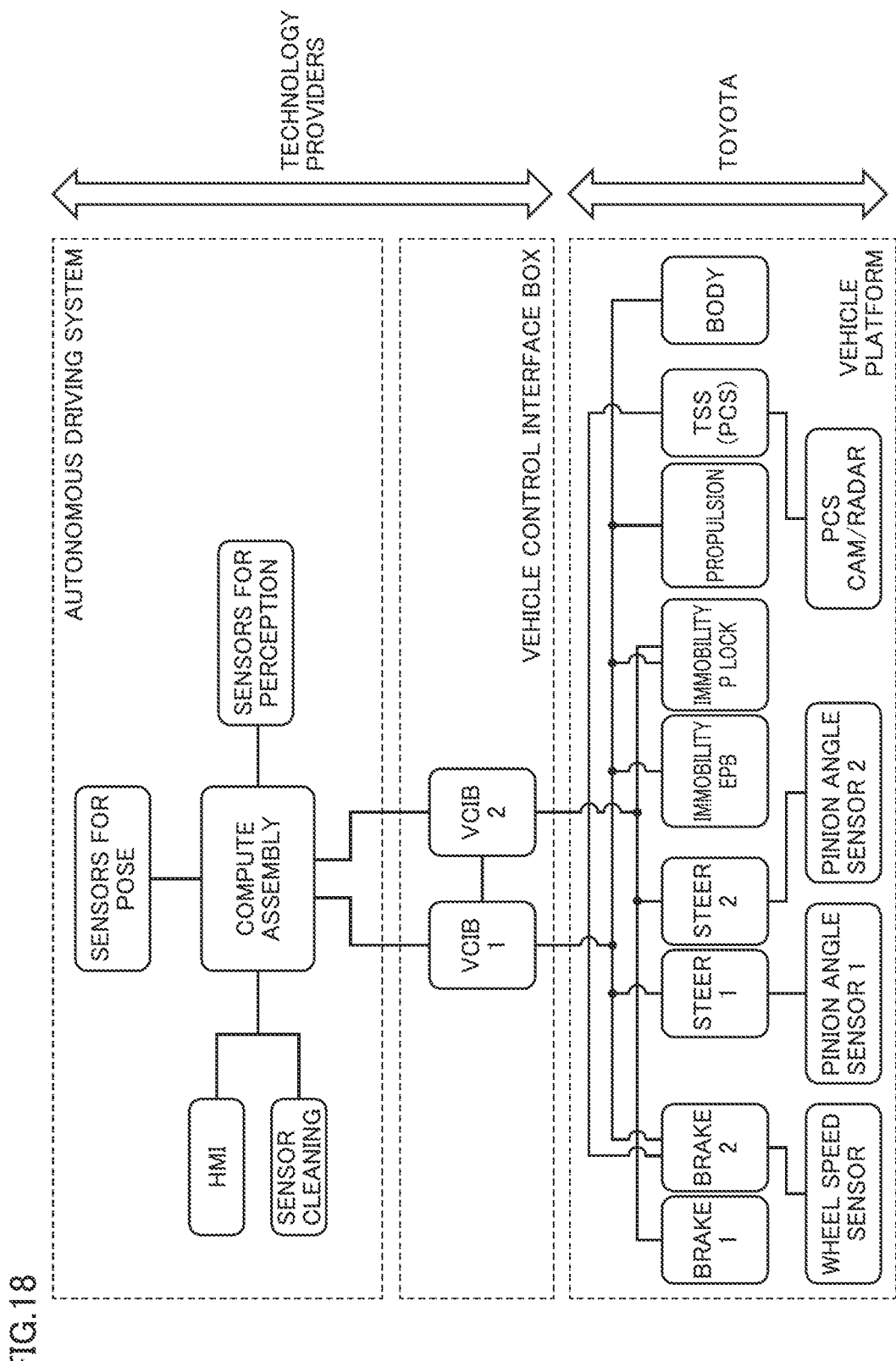
FIG. 18 is a diagram of a system configuration of a vehicle.
Figure 19:
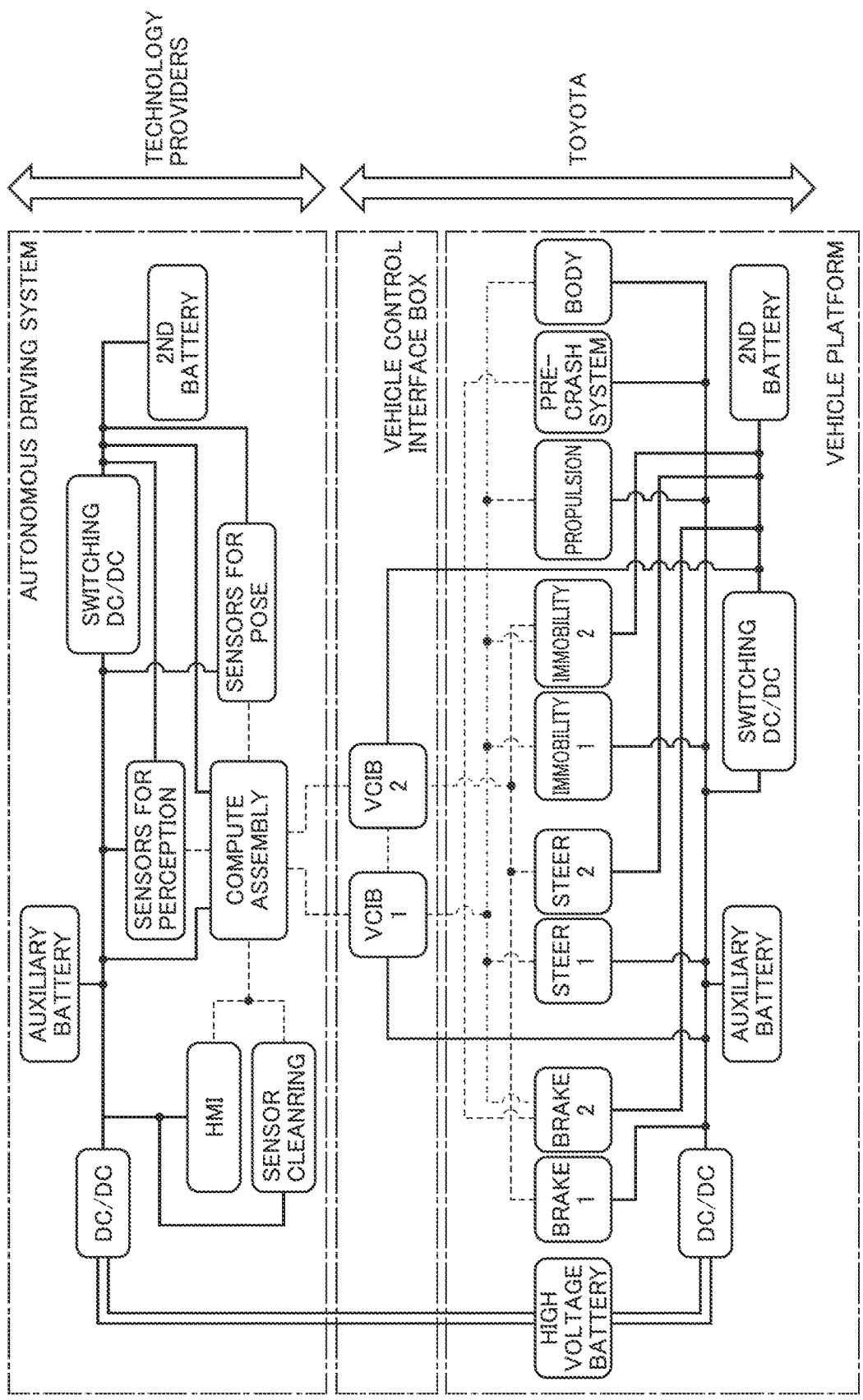
FIG. 19 is a diagram showing a configuration of supply of power of the vehicle.
Figure 20:
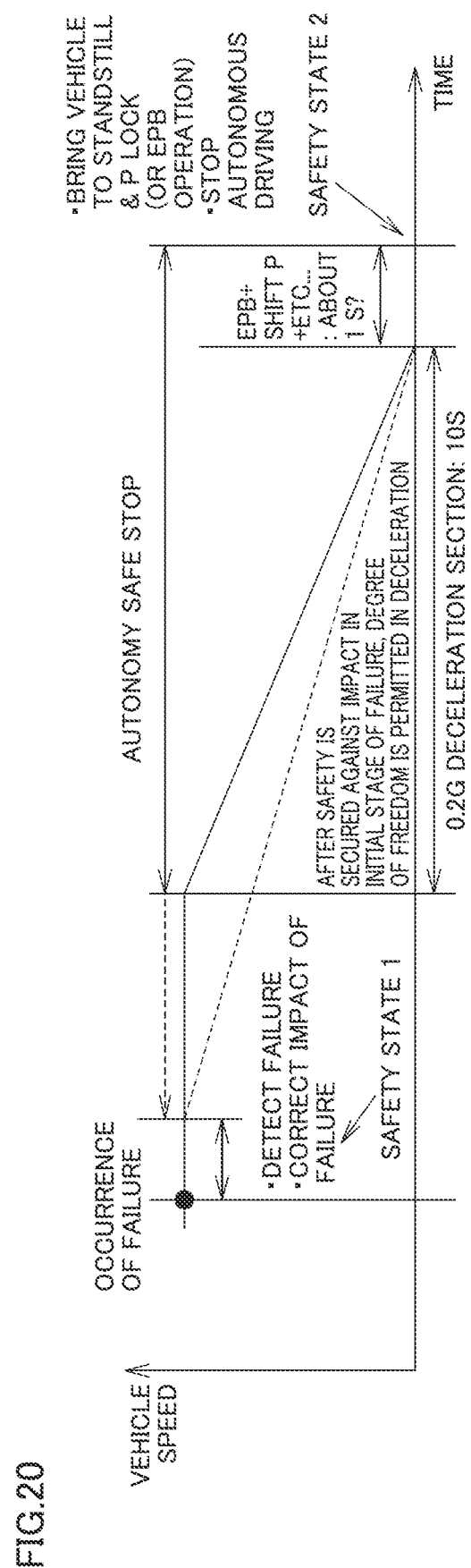
FIG. 20 is a diagram illustrating strategies until the vehicle is safely brought to a standstill at the time of occurrence of a failure.

1.4. Precaution for Handling
  This is an early draft of the document.
  All the contents are subject to change. Such changes are notified to the users. Please note that some parts are still T.B.D. will be updated in the future.
2. Architectural Concept
  2.1. Overall Structure of MaaS
  The overall structure of MaaS with the target vehicle is shown (FIG. 17).
  Vehicle control technology is being used as an interface for technology providers.
  Technology providers can receive open API such as vehicle state and vehicle control, necessary for development of automated driving systems.
  2.2. Outline of System Architecture on the Vehicle
  The system architecture on the vehicle as a premise is shown (FIG. 18).
  The target vehicle of this document will adopt the physical architecture of using CAN for the bus between ADS and VCIB. In order to realize each API in this document, the CAN frames and the bit assignments are shown in the form of "bit assignment chart" as a separate document.
  2.3. Outline of Power Supply Architecture on the Vehicle
  The power supply architecture as a premise is shown as follows (FIG. 19).
  The blue colored parts are provided from an ADS provider. And the orange colored parts are provided from the VP.
  The power structure for ADS is isolate from the power structure for VP. Also, the ADS provider should install a redundant power structure isolated from the VP.
3. Safety Concept
  3.1. Overall safety concept
  The basic safety concept is shown as follows.
  The strategy of bringing the vehicle to a safe stop when a failure occurs is shown as follows (FIG. 20).
  1. After occurrence of a failure, the entire vehicle executes "detecting a failure" and "correcting an impact of failure" and then achieves the safety state 1.
  2. Obeying the instructions from the ADS, the entire vehicle stops in a safe space at a safe speed (assumed less than 0.2G).
  However, depending on a situation, the entire vehicle should happen a deceleration more than the above deceleration if needed.

3. After stopping, in order to prevent slipping down, the entire vehicle achieves the safety state 2 by activating the immobilization system.

TABLE 107

| category | content |
|---|---|
| Precondition | Only one single failure at a time across the entire integrated vehicle. (Multiple failures are not covered) After the initial single failure, no other failure is anticipated in the duration in which the functionality is maintained. |
| Responsibility for the vehicle platform until safety state 2 | In case of a single failure, the integrated vehicle should maintain the necessary functionality for safety stop. The functionality should be maintained for 15 (fifteen) seconds. |
| Basic Responsibility Sharing | [For ADS] The ADS should create the driving plan, and should indicate vehicle control values to the VP. [For Toyota vehicle platform] The Toyota VP should control each system of the VP based on indications from the ADS. |

See the separated document called "Fault Management" regarding notifiable single failure and expected behavior for the ADS.

3.2. Redundancy

The redundant functionalities with Toyota's MaaS vehicle are shown.

Toyota's Vehicle Platform has the following redundant functionalities to meet the safety goals led from the functional safety analysis.

Redundant Braking

Any single failure on the Braking System doesn't cause loss of braking functionality. However, depending on where the failure occurred, the capability left might not be equivalent to the primary system's capability. In this case, the braking system is designed to prevent the capability from becoming 0.3 G or less.

Redundant Steering

Any single failure on the Steering System doesn't cause loss of steering functionality. However, depending on where the failure occurred, the capability left might not be equivalent to the primary system's capability. In this case, the steering system is designed to prevent the capability from becoming 0.3 G or less.

Redundant Immobilization

Toyota's MaaS vehicle has 2 immobilization systems, i.e. P lock and EPB. Therefore, any single failure of immobilization system doesn't cause loss of the immobilization capability. However, in the case of failure, maximum stationary slope angle is less steep than when the systems are healthy.

Redundant Power

Any single failure on the Power Supply System doesn't cause loss of power supply functionality. However, in case of the primary power failure, the secondary power supply system keeps supplying power to the limited systems for a certain time.

Redundant Communication

Any single failure on the Communication System doesn't cause loss of all the communication functionality. System which needs redundancy has physical redundant communication lines. For more detail information, see the chapter "Physical LAN architecture (in-Vehicle)".

4. Security Concept 4.1. Outline

Regarding security, Toyota's MaaS vehicle adopts the security document issued by Toyota as an upper document.

4.2. Assumed Risks

The entire risk includes not only the risks assumed on the base e-PF but also the risks assumed for the Autono-MaaS vehicle.

The entire risk is shown as follows.

[Remote Attack]
  To vehicle
    Spoofing the center
    ECU Software Alternation
    DoS Attack
    Sniffering
  From vehicle
    Spoofing the other vehicle
    Software Alternation for a center or an ECU on the other vehicle
    DoS Attack to a center or other vehicle
    Uploading illegal data

[Modification]
  Illegal Reprogramming
  Setting up an illegal ADK
  Installation of an unauthenticated product by a customer 4.3. Countermeasure for the Risks The countermeasure of the above assumed risks is shown as follows.

4.3.1. The Countermeasure for a Remote Attack

The countermeasure for a remote attack is shown as follows.

Since the autonomous driving kit communicates with the center of the operation entity, end-to-end security should be ensured. Since a function to provide a travel control instruction is performed, multi-layered protection in the autonomous driving kit is required. Use a secure microcomputer or a security chip in the autonomous driving kit and provide sufficient security measures as the first layer against access from the outside. Use another secure microcomputer and another security chip to provide security as the second layer. (Multi-layered protection in the autonomous driving kit including protection as the first layer to prevent direct entry from the outside and protection as the second layer as the layer below the former)

4.3.2. The Countermeasure for a Modification

The countermeasure for a modification is shown as follows.

For measures against a counterfeit autonomous driving kit, device authentication and message authentication are carried out. In storing a key, measures against tampering should be provided and a key set is changed for each pair of a vehicle and an autonomous driving kit. Alternatively, the contract should stipulate that the operation entity exercise sufficient management so as not to allow attachment of an unauthorized kit. For measures against attachment of an unauthorized product by an Autono-MaaS vehicle user, the contract should stipulate that the operation entity exercise management not to allow attachment of an unauthorized kit.

In application to actual vehicles, conduct credible threat analysis together, and measures for addressing most recent vulnerability of the autonomous driving kit at the time of LO should be completed.

5. Function Allocation 5.1. in a healthy situation

Figure 21:
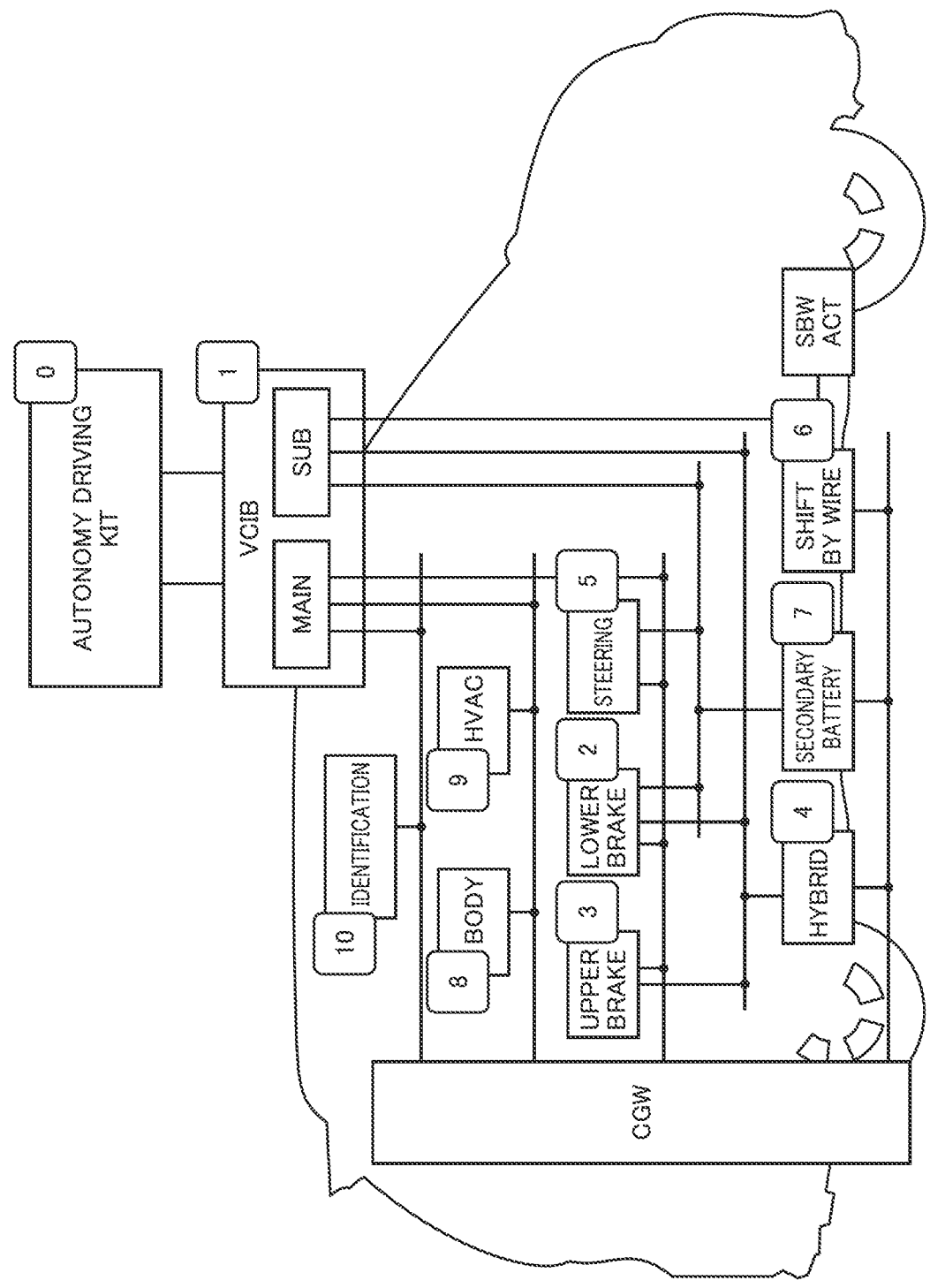
FIG. 21 is a diagram showing arrangement of representative functions of the vehicle.

The allocation of representative functionalities is shown as below (FIG. 21).

[Function Allocation]

TABLE 108

| Function category | Function name | Related to # | remarks |
|---|---|---|---|
| Planning | Plan for driving path | 0 | |
| | Calculating control indications | 0 | e.g. longitudinal G |
| Overall | API Pub/Sub | 1 | One system with redundancy |
| Security | Autonomy Driving Kit Authentication | 1 | One system with redundancy |
| | Message Authentication | 1 | One system with redundancy |
| | Door locking control | 8 | |
| Longitudinal/ Lateral | Motion control | 2 (Primary), 3 (Secondary) | |
| | Propulsion control | 4 | |
| | Braking control | 2, 3 | Two units controlled according to deceleration requirement |
| | Steering control | 5 | One system with redundancy |
| | Immobilization control | 2 (EPB), 6 (P Lock) | |
| | Shift control | 6 | |
| Power supply | Secondary battery control | 7 | |
| | Vehicle power control | 10 | For more information, see the API specification. |
| Access/ Comfort | Body control | 8 | Turn signal, Headlight, Window, etc. |
| | HVAC control | 9 | |
| Data | Data logging (at event) | 1 | |
| | Data logging (constantly) | 1 | |

5.2. In a Single Failure

See the separated document called "Fault Management" regarding notifiable single failure and expected behavior for the ADS.

Though embodiments of the present disclosure have been described above, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A vehicle on which an autonomous driving system is mountable, the vehicle comprising:
    a vehicle platform that carries out vehicle control in accordance with a command from the autonomous driving system; and
    a vehicle control interface that interfaces between the autonomous driving system and the vehicle platform, wherein
    a first command that requests for an acceleration value or a deceleration value and a second command that requests for immobilization of the vehicle are transmitted from the autonomous driving system to the vehicle platform through the vehicle control interface,
    a signal indicating a standstill state of the vehicle is transmitted from the vehicle platform to the autonomous driving system through the vehicle control interface, and
    when a request for deceleration is made to the vehicle platform in the first command, the vehicle platform transmits the signal to the autonomous driving system at time when the vehicle comes to a standstill, and the vehicle platform immobilizes the vehicle in response to the second command received after transmission of the signal, wherein
    the vehicle platform includes an electric steering system that steers the vehicle,
    when a driver operation occurs during an autonomous driving, the vehicle platform controls a motor torque of the electric steering system in coordination with the driver, taking into account the driver's steering intention, and
    an object to be controlled by the first command is different from an object to be controlled by the second command,
    the object to be controlled by the second command includes an electric parking brake and a P-Lock device, and
    the acceleration required by the first command becomes zero when both the electric parking brake and the P-Lock device are activated.

2. The vehicle according to claim 1, wherein
    a tire turning angle command that requests for a wheel steer angle is further transmitted from the autonomous driving system to the vehicle platform through the vehicle control interface,
    the vehicle platform controls the electric steering system such that a motor torque is set by an amount of the driver operation and the tire turning angle command when the driver operates a steering wheel during the autonomous driving.

3. A method of controlling a vehicle on which an autonomous driving system is mountable, the vehicle including a vehicle platform that carries out vehicle control in accordance with a command from the autonomous driving system and a vehicle control interface that interfaces between the autonomous driving system and the vehicle platform, the vehicle platform including an electric steering system that steers the vehicle, the method comprising:
    transmitting a first command that requests for an acceleration value or a deceleration value and a second command that requests for immobilization of the vehicle from the autonomous driving system to the vehicle platform through the vehicle control interface;
    transmitting a signal indicating a standstill state of the vehicle from the vehicle platform to the autonomous driving system through the vehicle control interface;
    transmitting, by the vehicle platform, when a request for deceleration is made to the vehicle platform in the first command, the signal to the autonomous driving system at time when the vehicle comes to a standstill;
    immobilizing, by the vehicle platform, the vehicle in response to the second command received after transmission of the signal; and
    controlling, when a driver operation occurs, a motor torque of the electric steering system in coordination with the driver, taking into account the driver's steering intention, wherein
    an object to be controlled by the first command is different from an object to be controlled by the second command,
    the object to be controlled by the second command includes an electric parking brake and a P-Lock device, and the acceleration required by the first command becomes zero when both the electric parking brake and the P-Lock device are activated.

4. The method of controlling a vehicle according to claim 3,
 a tire turning angle command that requests for a wheel steer angle is further transmitted from the autonomous driving system to the vehicle platform through the vehicle control interface,
 the method further comprising controlling the electric steering system such that a motor torque is set by an amount of the driver operation and the tire turning angle command when the driver operates a steering wheel during the autonomous driving.

* * * * *